US012691993B2

(12) United States Patent
Scott et al.

(10) Patent No.: US 12,691,993 B2
(45) Date of Patent: Jul. 28, 2026

(54) INSULATION BLANKET ASSEMBLIES AND METHODS

(71) Applicant: The Boeing Company, Arlington, VA (US)

(72) Inventors: Steven Scott, Newcastle, WA (US);
Valeriy Vinogradov, Kent, WA (US);
Alan Lagervall, Pacific, WA (US);
Mehmet Volkan, Renton, WA (US);
Sara Walter, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/658,555

(22) Filed: May 8, 2024

(65) Prior Publication Data

US 2025/0058867 A1 Feb. 20, 2025

Related U.S. Application Data

(60) Provisional application No. 63/533,610, filed on Aug. 18, 2023.

(51) Int. Cl.
B64C 1/40 (2006.01)

(52) U.S. Cl.
CPC .................................... B64C 1/403 (2013.01)

(58) Field of Classification Search
CPC .................................. B64C 1/40; B64C 1/403
See application file for complete search history.

(56) References Cited

U.S. PATENT DOCUMENTS

| | | | | |
|---|---|---|---|---|
| 4,712,349 A | * | 12/1987 | Riley ...................... | E04D 11/02 |
| | | | | 52/309.12 |
| 5,435,679 A | | 7/1995 | Barry | |
| 5,811,167 A | | 9/1998 | Norvell | |
| 6,260,660 B1 | * | 7/2001 | Yoerkie, Jr. ............... | B64C 1/40 |
| | | | | 181/290 |
| 6,358,591 B1 | * | 3/2002 | Smith ........................ | B64C 1/40 |
| | | | | 428/920 |
| 7,040,575 B2 | * | 5/2006 | Struve ........................ | B64C 1/40 |
| | | | | 244/118.5 |
| 7,083,147 B2 | * | 8/2006 | Movsesian .............. | B32B 18/00 |
| | | | | 428/72 |
| 8,662,448 B2 | * | 3/2014 | Weston ................ | B61D 17/185 |
| | | | | 244/119 |

(Continued)

OTHER PUBLICATIONS

European Patent Office, Extended European Search Report, App. No. 24192211.1 (Dec. 16, 2024).

*Primary Examiner* — Joshua J Michener
*Assistant Examiner* — Michael B. Kreiner
(74) *Attorney, Agent, or Firm* — Walters & Wasylyna LLC

(57) ABSTRACT

An insulation blanket assembly for use on an aircraft includes a cover. The cover has an inboard material and an outboard material. The insulation blanket assembly also includes an insulation material between the inboard material and the outboard material. The insulation blanket assembly also includes one or more support rails attached to at least one of the cover or the insulation material. When the insulation blanket assembly is attached to the aircraft, the one or more support rails are configured to provide separation between an aircraft structure and the insulation material to reduce or eliminate moisture from transferring to the insulation material.

20 Claims, 21 Drawing Sheets

(56) References Cited

U.S. PATENT DOCUMENTS

| | | | | |
|---|---|---|---|---|
| 8,770,343 B2* | 7/2014 | Mathur | .................... | B32B 3/12 |
| | | | | 428/116 |
| 9,211,945 B2* | 12/2015 | Redecker | ............... | B64C 1/067 |
| 9,352,821 B2 | 5/2016 | Wilander | | |
| 10,633,075 B2 | 4/2020 | Guering et al. | | |
| 10,640,195 B2* | 5/2020 | Guering | .................... | B64F 5/10 |
| 10,814,954 B2* | 10/2020 | Zaman | ...................... | B64C 1/40 |
| 10,875,624 B2* | 12/2020 | Malston | ................. | B32B 25/04 |
| 11,858,431 B2* | 1/2024 | Chopard | ............. | B60R 13/0815 |
| 11,858,614 B2* | 1/2024 | Zaman | ...................... | B64C 1/40 |
| 2011/0024561 A1 | 2/2011 | Koefinger et al. | | |
| 2011/0284689 A1* | 11/2011 | Thomas | ............... | G10K 11/168 |
| | | | | 244/1 N |
| 2017/0368608 A1* | 12/2017 | Homma | .................... | B64C 1/40 |
| 2019/0367151 A1* | 12/2019 | Hitchcock | ............. | F16J 15/061 |
| 2023/0117007 A1* | 4/2023 | Gourishankar | ......... | B32B 18/00 |
| | | | | 428/626 |

* cited by examiner

1700

APPLYING (I) FIRST HOOK TAPE TO A FIRST INNER MOLD LINE OF A FIRST AIRCRAFT FRAME STRUCTURE AND (II) SECOND HOOK TAPE TO A SECOND INNER MOLD LINE OF A SECOND AIRCRAFT FRAME STRUCTURE, WHEREIN THE FIRST HOOK TAPE AND THE SECOND HOOK TAPE ARE DOUBLE-SIDED TAPES

1702

APPLYING (I) FIRST LOOP TAPE TO A FIRST GROUP OF BLANKET TABS ATTACHED TO A FIRST EDGE OF AN OUTBOARD MATERIAL OF AN INSULATION BLANKET ASSEMBLY AND (II) SECOND LOOP TAPE TO A SECOND GROUP OF BLANKET TABS ATTACHED TO A SECOND EDGE OF THE OUTBOARD MATERIAL, WHEREIN THE FIRST LOOP TAPE AND THE SECOND LOOP TAPE ARE DOUBLE-SIDED TAPES, AND WHEREIN THE INSULATION BLANKET ASSEMBLY COMPRISES ONE OR MORE SUPPORT RAILS THAT EXTEND TRANSVERSE RELATIVE TO AIRCRAFT STRINGERS

1704

ATTACHING (I) THE FIRST GROUP OF BLANKET TABS TO THE FIRST INNER MOLD LINE BY PLACING THE FIRST LOOP TAPE ON TOP OF THE FIRST HOOK TAPE AND (II) THE SECOND GROUP OF BLANKET TABS TO THE SECOND INNER MOLD LINE BY PLACING THE SECOND LOOP TAPE ON TOP OF THE SECOND HOOK TAPE

INSULATION BLANKET ASSEMBLIES AND METHODS

CROSS-REFERENCE TO RELATED APPLICATION

The present application claims priority from U.S. Provisional Patent Application No. 63/533,610, entitled "Support Rails for Insulation Blanket", filed Aug. 18, 2023, the contents of which is incorporated by reference in its entirety.

FIELD

The present disclosure generally relates to insulation, and more particularly, to support rails for aircraft insulation blankets.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Aircrafts use thermal and acoustic insulation for different purposes. For example, thermal and acoustic insulation can be used to reduce noise transfer and thermal conduction with outside elements of an aircraft. Additionally, thermal and acoustic insulation can be used to channel moisture generated in an upper lobe cabin of the aircraft down to drains in a lower lobe structure of the aircraft, where the moisture exits the aircraft. However, thermal and acoustic insulation can become saturated from the moisture and can block water on its way along a drain path.

SUMMARY

The present application is directed to reducing a rate at which an insulation blanket becomes saturated on an aircraft. In particular, according to the present application, one or more support rails are attached to, or embedded within, the insulation blanket to provide separation between an insulation material of the insulation blanket and an aircraft structure, such as a fuselage panel, to reduce or eliminate moisture associated with the aircraft structure from saturating the insulation material.

Moisture generated in an upper lobe of the aircraft is typically channeled down to drains in a lower lobe structure of the aircraft, from which the moisture exits the aircraft. Thus, moisture typically collects near a lower lobe cheek and bilge of the aircraft before exiting the aircraft. As a result, the lower lobe cheek and bilge of the aircraft can be a relatively wet environment. Along with reducing noise transfer with a surrounding environment of the aircraft, reducing thermal conduction with the surrounding environment of the aircraft, and acting as a barrier against other external hazards, the insulation blanket can be used to channel moisture from the upper lobe of the aircraft down to the drains in the lower lobe structure of the aircraft.

To reduce the likelihood or risk of the insulation blanket blocking water on its way down drain paths, one or more support rails are attached to, or embedded within, the insulation blanket to provide separation between the insulation material and different aircraft structures (e.g., to prevent the insulation material from laying flush against skin and structure in the lower lobe structure of the aircraft). The one or more support rails can be made of a foam material.

The foam support rails allow water drainage above and below the surface of the insulation blanket. In particular, the one or more support rails may be comprised of a closed cell foam to reduce or eliminate moisture absorption. Additionally, the increased gap between the insulation material and the lower lobe structure of the aircraft can prevent the insulation material within the insulation blanket from becoming saturated with moisture, thus increasing the in-service performance of the insulation blanket.

In one aspect, the present application discloses an insulation blanket assembly for use on an aircraft includes a cover. The cover has an inboard material and an outboard material. The insulation blanket assembly also includes an insulation material between the inboard material and the outboard material. The insulation blanket assembly also includes one or more support rails attached to at least one of the cover or the insulation material. When the insulation blanket assembly is attached to the aircraft, the one or more support rails are configured to provide separation between an aircraft structure and the insulation material to reduce or eliminate moisture from transferring to the insulation material.

In another aspect, the present application discloses an aircraft. The aircraft includes a fuselage. The fuselage includes a plurality of frame structures and a plurality of stringers attached to the plurality of frame structures. The plurality of stringers extend laterally along a length of the fuselage. The aircraft also includes an insulation blanket assembly attached to at least one frame structure of the plurality of frame structures or to at least one stringer of the plurality of stringers. The insulation blanket assembly includes one or more support rails that extend transverse relative to the plurality of stringers.

In another aspect, the present application discloses a method of making an insulation blanket assembly for an aircraft. The method includes providing an insulation material. The method also includes forming a cover. The method also includes, prior to or after forming the cover, attaching one or more support rails to at least one of the cover or the insulation material such that, when installed on the aircraft, the one or more support rails provide separation of the insulation material from an outer panel of the aircraft for moisture management.

In another aspect, the present application discloses a method of installing an insulation blanket assembly on an aircraft. The method includes applying (i) first hook tape to a first inner mold line of a first aircraft frame structure and (ii) second hook tape to a second inner mold line of a second aircraft frame structure. The first hook tape and the first hook tape are double-sided tapes. The method also includes applying (i) first loop tape to a first group of blanket tabs attached to a first edge of an outboard material of an insulation blanket assembly and (ii) second loop tape to a second group of blanket tables attached to a second edge of the outboard material. The first loop tape and the second loop tape are double-sided tapes, and the insulation blanket assembly comprises one or more support rails that extend transverse relative to aircraft stringers. The method also includes attaching (i) the first group of blanket tabs to the first inner mold line by placing the first loop tape on top of the first hook tape and (ii) the second group of blanket tabs to the second inner mold line by placing the second loop tape on top of the second hook tape.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

FIG. 17 is a flowchart of another example of an implementation of a method, according to an exemplary embodiment.

DETAILED DESCRIPTION

Figure 1A:
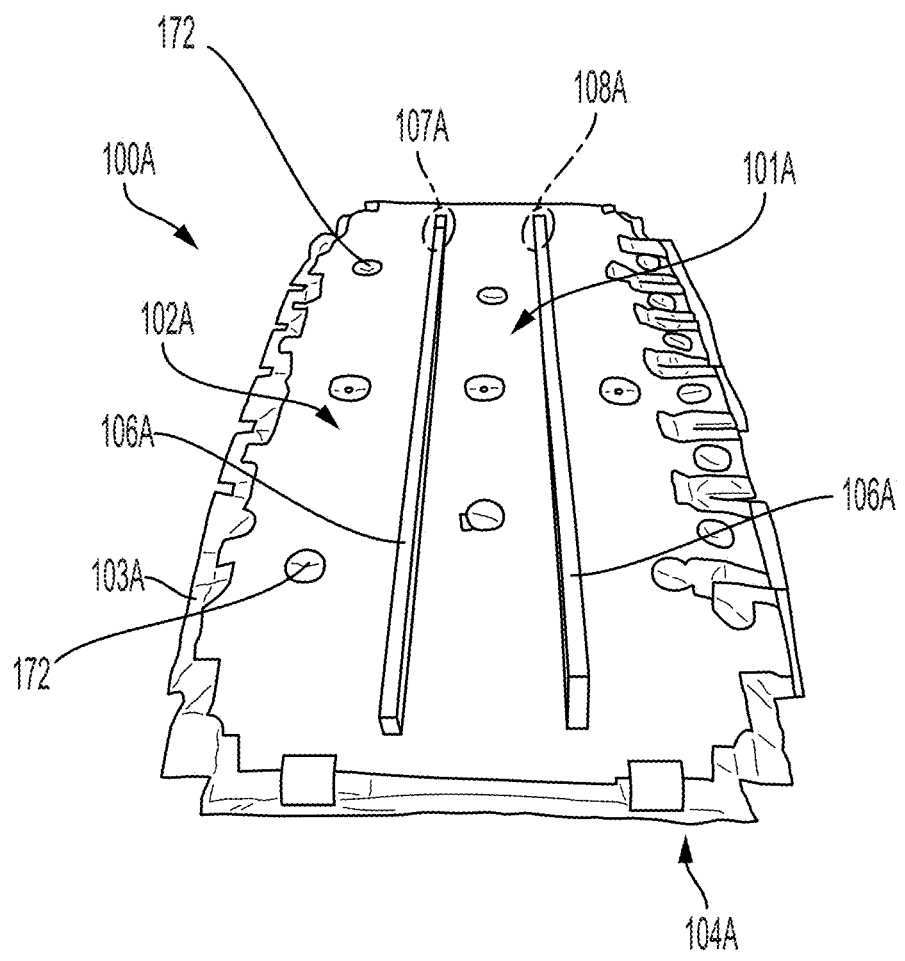
FIG. 1A illustrates a diagram of an insulation blanket assembly that includes one or more support rails, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIGS. 1A and 1E, insulation blanket assemblies are illustrated and associated with reference number 100. When referring to a particular one of the insulation blanket assemblies, such as the insulation blanket assembly 100A, the distinguishing letter "A" is used. However, when referring to any arbitrary one of the insulation blanket assemblies or to the insulation blanket assemblies as a group, the reference number 100 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1A, a diagram of an insulation blanket assembly 100A that includes one or more support rails is illustrated, according to an exemplary embodiment. According to some implementations, as described in greater detail with respect to FIG. 2, the insulation blanket assembly 100A can be installed on an aircraft 200.

The insulation blanket assembly 100A includes a cover 101A having an outboard material 102A and an inboard material 104A. The insulation blanket assembly 100A also includes an insulation material 110A between the inboard material 104A and the outboard material 102A. For example, referring to the cross-sectional view of the insulation blanket assembly 100A in FIG. 1B, to seal in the insulation material 110A, the outboard material 102A of the cover 101A is wrapped around a first side of the insulation material 110A, and the inboard material 104A of the cover 101A is wrapped around a second side of the insulation material 110A. An edge of the inboard material 104A is attached to an edge of the outboard material 102A via tape 103A.

Figure 1B:
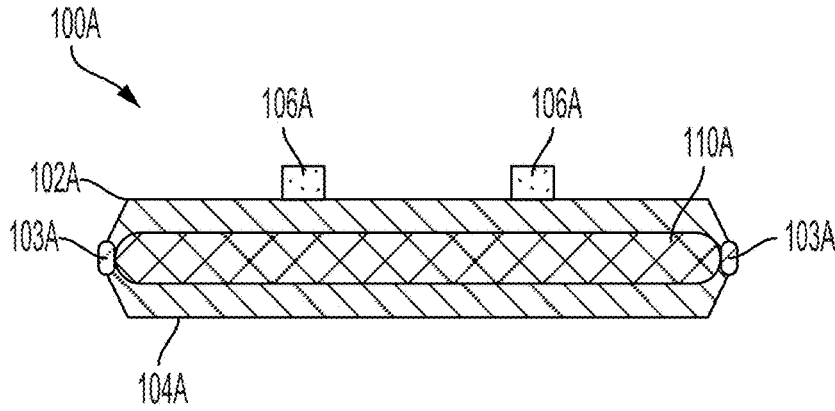
FIG. 1B illustrates a cross-sectional diagram of an insulation blanket assembly that includes one or more support rails, according to an exemplary embodiment.

As depicted in FIGS. 1A and 1B, the insulation blanket assembly 100A also includes one or more support rails 106A attached to the cover 101A. In particular, the one or more support rails 106A are attached to the outboard material 102A of the cover 101A such that the outboard material 102A is between the insulation material 110A and the one or more support rails 106A. The one or more support rails 106A may be attached with double-sided tape or a garment tags. As described below, when the insulation blanket assembly 110A is attached to an aircraft, such as the aircraft 200 of FIG. 2, the one or more support rails 106A are configured to provide separation between an aircraft structure (e.g., such as an aircraft stringer or an aircraft fuselage structure) and the insulation material 110A to reduce or eliminate moisture from transferring to the insulation material 110A.

As depicted in FIG. 1A, each support rail 106A of the one or more support rails 106A may include an elongated member that has a length that is less than a length of the cover 101A such that ends of the one or more support rails 106A are separated laterally from a perimeter of the cover 101A. In FIG. 1A, the insulation blanket assembly 100A includes two (2) support rails 106A that extend in a parallel direction relative to each other. However, in other implementations, the insulation blanket assembly 100A can include additional (or fewer) support rails 106A. As a non-limiting example, in one implementation, the insulation blanket assembly 100A can include five (5) support rails 106A extended in a parallel direction relative to each other. The support rails 106A may be comprised of a flexible material to enable the support rails 106A to be flexible. As a non-limiting example, the support rails 106A may be comprised of a foam material.

According to one implementation, a first support rail 106A of the one or more support rails 106A has a first length, and a second support rail 106A of the one or more support rails 106A has a second length that is less than the first length to provide variable rigidity along the insulation blanket assembly 100A. According to one implementation, a first support rail 106A of the one or more support rails 106 has a first width, and a second support rail 106A of the one or more support rails 106A has a second width that is less than the first width. The first and second support rails 106A may be comprised of the same foam material such that the first support rail 106A has a different stiffness than the second support rail 106A to provide rigidity to the insulation blanket assembly 100A.

The insulation blanket assembly 100 may also include a plurality of attachment portions 172. Each attachment portion 172 includes a hole that extends through the cover 101A and the insulation material 110A to facilitate attachment of the insulation blanket assembly 100A to an aircraft structure with a fastener.

Figure 1C:
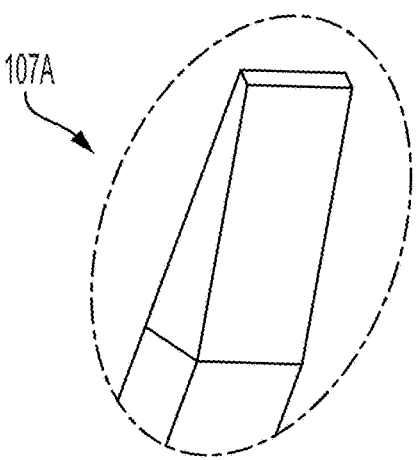
FIG. 1C illustrates a support rail that includes a beveled edge, according to an exemplary embodiment.
Figure 1D:
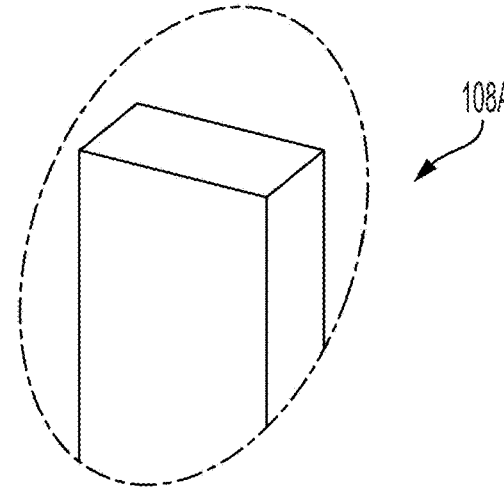
FIG. 1D illustrates a support rail that includes a straight edge, according to an exemplary embodiment.

As depicted in FIGS. 1A and 1C, at least one support rail 106A of the one or more support rails 106A is an elongated member that includes a beveled edge 107A on opposing ends of the elongated member to facilitate sliding the insulation blanket assembly 110A into position prior to securing the insulation blanket assembly 110A to an aircraft structure. As depicted in FIGS. 1A and 1D, at least one support rail 106A of the one or more support rails 106A is an elongated member that includes a straight edge 108A. Although FIG. 1A illustrates one support rail 106A having the beveled edge 107A and one support rail 106A having the straight edge 108A, in other implementations, the edges of the support rails 106A can be consistent for the insulation blanket assembly 100A. For example, each support rail 106A can have the beveled edge 107A or each support rail 106A can have the straight edge 108A.

Figure 1E:
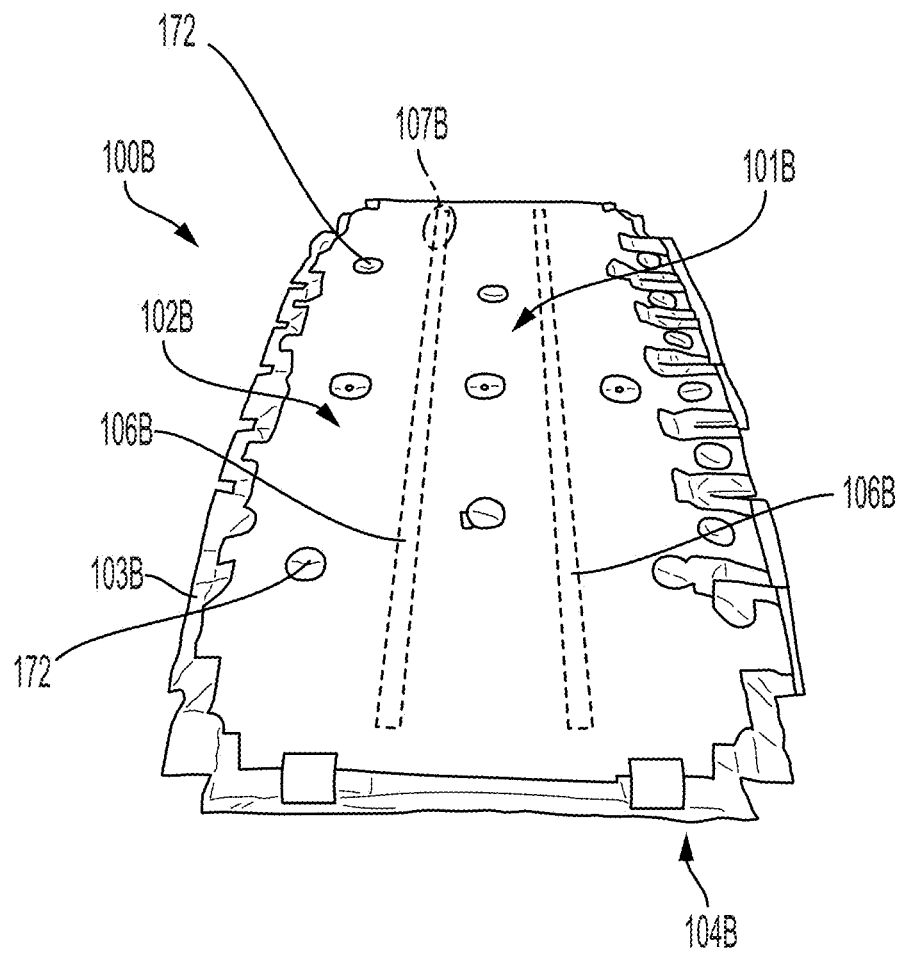
FIG. 1E illustrates another diagram of an insulation blanket assembly that includes one or more support rails, according to an exemplary embodiment.

Referring to FIG. 1E, another diagram of an insulation blanket assembly 100B that includes one or more support rails is illustrated, according to an exemplary embodiment. According to some implementations, as described in greater detail with respect to FIG. 2, the insulation blanket assembly 100B can be installed on the aircraft 200.

The insulation blanket assembly 100B includes a cover 101B having an outboard material 102B and an inboard material 104B. The insulation blanket assembly 100B also includes an insulation material 110B between the inboard material 104B and the outboard material 102B. For example, referring to the cross-sectional view of the insulation blanket assembly 100B in FIG. 1F, to seal in the insulation material 110B, the outboard material 102B of the cover 101B is wrapped around a first side of the insulation material 110B, and the inboard material 104B of the cover 101B is wrapped around a second side of the insulation material 110B. An edge of the inboard material 104B is attached to an edge of the outboard material 102B via tape 103B.

Figure 1F:
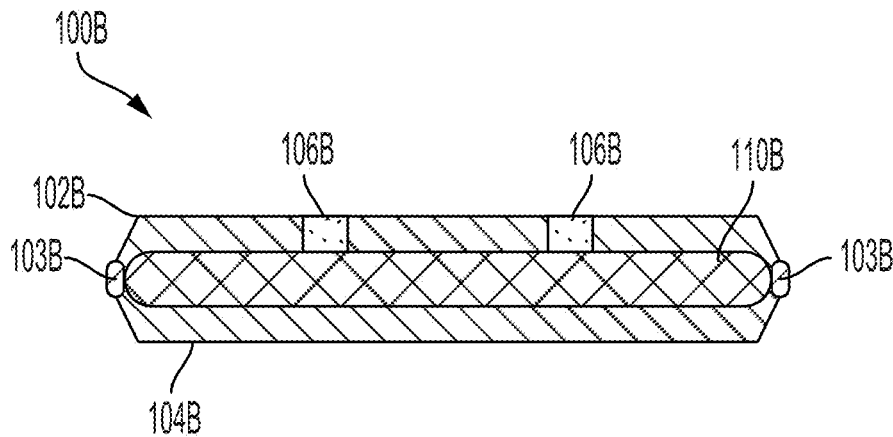
FIG. 1F illustrates a cross-sectional diagram of an insulation blanket assembly that includes one or more support rails, according to an exemplary embodiment.

As depicted in FIGS. 1E and 1F, the insulation blanket assembly 100F also includes one or more support rails 106B attached to the insulation material 110B. In particular, the one or more support rails 106B are attached to the insulation material 110B such that the one or more support rails 106B are positioned between the outboard material 102B and the insulation material 110B. The one or more support rails 106B may be attached with double-sided tape. As described below, when the insulation blanket assembly 110B is attached to an aircraft, such as the aircraft 200 of FIG. 2, the one or more support rails 106B are configured to provide separation between an aircraft structure (e.g., such as an aircraft stringer or an aircraft fuselage structure) and the insulation material 110B to reduce or eliminate moisture from transferring to the insulation material 110B.

As depicted in FIG. 1E, each support rail 106B of the one or more support rails 106B may include an elongated member that has a length that is less than a length of the cover 101B such that ends of the one or more support rails 106B are separated laterally from a perimeter of the cover 101B. In FIG. 1E, the insulation blanket assembly 100B includes two (2) support rails 106B that extend in a parallel direction relative to each other. However, in other implementations, the insulation blanket assembly 100B can include additional (or fewer) support rails 106B. As a non-limiting example, in one implementation, the insulation blanket assembly 100B can include five (5) support rails 106B extended in a parallel direction relative to each other. The support rails 106B may be comprised of a flexible material to enable the support rails 106B to be flexible. As a non-limiting example, the support rails 106B may be comprised of a foam material.

According to one implementation, a first support rail 106B of the one or more support rails 106B has a first length, and a second support rail 106B of the one or more support rails 106B has a second length that is less than the first length to provide variable rigidity along the insulation blanket assembly 100B. According to one implementation, a first support rail 106B of the one or more support rails 106B has a first width, and a second support rail 106B of the one or more support rails 106B has a second width that is less than the first width. The first and second support rails 106B may be comprised of the same foam material such that the first support rail 106B has a different stiffness than the second support rail 106B to provide rigidity to the insulation blanket assembly 100B.

The insulation blanket assembly 100B may also include a plurality of attachment portions 172. Each attachment portion 172 includes a hole that extends through the cover 101B and the insulation material 110B to facilitate attachment of the insulation blanket assembly 100B to an aircraft structure with a fastener.

Figure 1G:
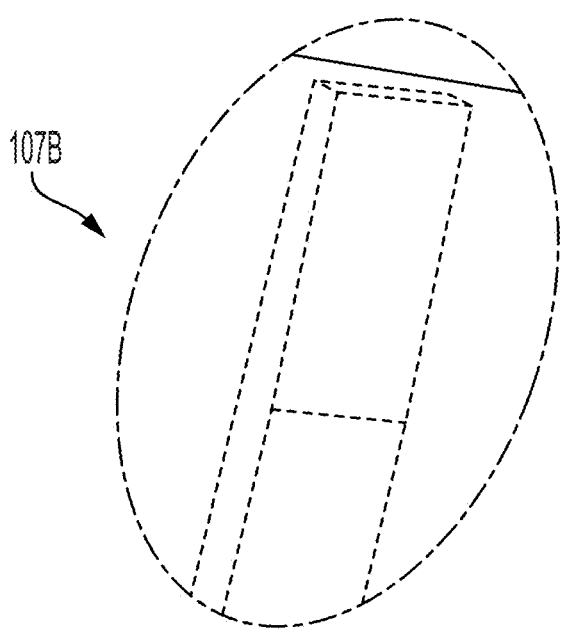
FIG. 1G illustrates a support rail that includes a beveled edge, according to an exemplary embodiment.

As depicted in FIGS. 1E and 1G, at least one support rail 106B of the one or more support rails 106B is an elongated member that includes a beveled edge 107B on opposing ends of the elongated member to facilitate sliding the insulation blanket assembly 110B into position prior to securing the insulation blanket assembly 110B to an aircraft structure.

Although rectangular support rails 106 are illustrated, different patterns of stiffeners (e.g., support rails) may be utilized according to techniques described herein. Additionally, multiple stiffener cross sections can be utilized according to the techniques described herein. A rectangular stiffener may be used for simplicity; however, a triangle stiffener may add rigidity for higher fabrication costs. In some implementations, multiple rectangular stiffeners may be laminated together in a leaf spring pattern and preloaded with curvature for added stiffness with no additional weight expense.

Figure 2:
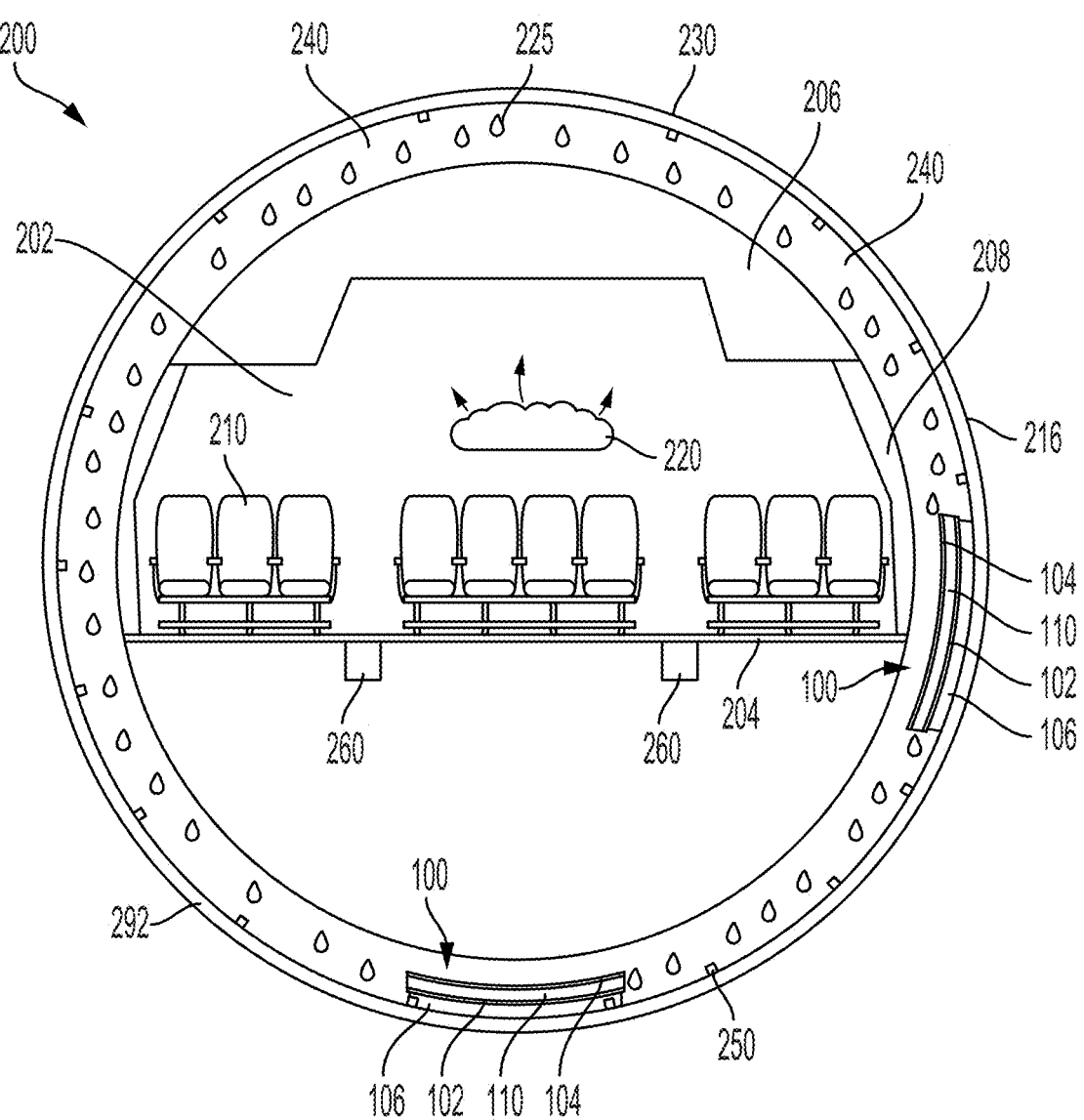
FIG. 2 illustrates a cross-sectional, schematic view of an aircraft that includes an insulation blanket assembly, according to an exemplary embodiment.

FIG. 2 illustrates a cross-sectional, schematic view of an aircraft 200 that includes an insulation blanket assembly, according to an exemplary embodiment. In particular, FIG. 2 depicts a fuselage 230 of the aircraft 200.

The fuselage 230 includes a floor 204, a ceiling 206, and an aesthetic fascia wall or an inner wall 208 that defines a cabin 202, where the ceiling 206 and/or the inner wall 208 represents an interior wall of the aircraft 200. The floor 204 of the cabin 202 may be supported by a plurality of supporting beams 260. The inner wall 208 is a lining that separates a main cabin, cockpit, and/or other areas within the aircraft 200 from the fuselage 230. The inner wall 208 can be made of plastic, glass-fiber, carbon fiber, glass-reinforced resin, other reinforced polymers, and/or other materials. The inner wall 208 can be designed to provide thermal and acoustic insulation as well.

Passengers in the aircraft 200 may congregate in seats 210 of the cabin 202 during flight. FIG. 2 illustrates that, inside of the fuselage 230 (e.g., in the cabin 202), respiration and other sources of water cause a moisture 220 to enter or form in the air in the cabin 202. As a non-limiting example, warm exhaled air includes the moisture 220 and rises upward through the ceiling 206. Some of the warm air rises into a space 240 between an outer wall 216 of the aircraft 200 and the cabin 202.

As the outer wall 216 is cooled by outside air at high altitude during flight, the temperature of the outer wall 216 eventually decreases to a temperature below a freezing temperature of water. This cooling causes the moisture 220 (e.g., water) to condense out of the air in the space 240 and freeze onto an interior surfaces of the outer wall 216 as ice. As the aircraft 200 changes to a lower altitude and/or commences descent for landing and the temperature increases, the ice begins to melt causing water droplets 225 (e.g., liquid) to travel through the space 240 towards a bottom of the fuselage 230.

The space 240 can include one or more insulation blanket assemblies 100 to provide thermal and acoustic insulation to the aircraft 200. The insulation blanket assemblies 100 in FIG. 2 can correspond to the insulation blanket assembly 100A of FIG. 1A or the insulation blanket assembly 110B of FIG. 1E. As illustrated in FIG. 2, the support rails 106 of one of the insulation blanket assemblies 110 are proximate to (e.g., resting on) aircraft stringers 250 running along the outer wall 216 of the fuselage 230.

The one or more support rails 106 may extend perpendicular relative to the stringers 250 such that the one or more support rails 106 provide a drainage path downwardly towards a lower area of the fuselage 230. For example, the orientation of the support rails 106 is perpendicular to an orientation of the aircraft stringers 250 such that the support rails 106 can rest on the aircraft stringers 250 to provide separation between the insulation material 110 and an aircraft structure, such as the aircraft stringers 250 and/or the outer wall 216 of the fuselage 230. The support rails 106 of the other insulation blanket assembly 100 is resting flush on the outer wall 216 of the fuselage 230 to provide separation between the insulation material 110 and the outer wall 216.

The support rails 106 reduce an amount of moisture transferred to the insulation material 110 as the water droplets 225 (e.g., liquid) travel through the space 240 towards the bottom of the fuselage 230. For example, the separation between the insulation material 110 and the different aircraft structures caused by the support rails 106 enable the insulation material 110 to remain relatively dry, which decreases the rate at which the insulation material 110 becomes saturated and thus improves (e.g., lengthens) the lifespan of the insulation blanket assembly 100. It should also be appreciated that because the support rails 106 are flexible (e.g., comprised of a foam material), the support rails 106 can take the shape of the aircraft structures on which the insulation blanket assemblies 100 rest. For example, because the one or more support rails 106 are comprised of a flexible foam material, and because the insulation material 110 and the cover 101 are flexible, the insulation blanket assembly 100 may radially conform to a shape of the fuselage 230 of the aircraft 200 when installed.

Figure 3:
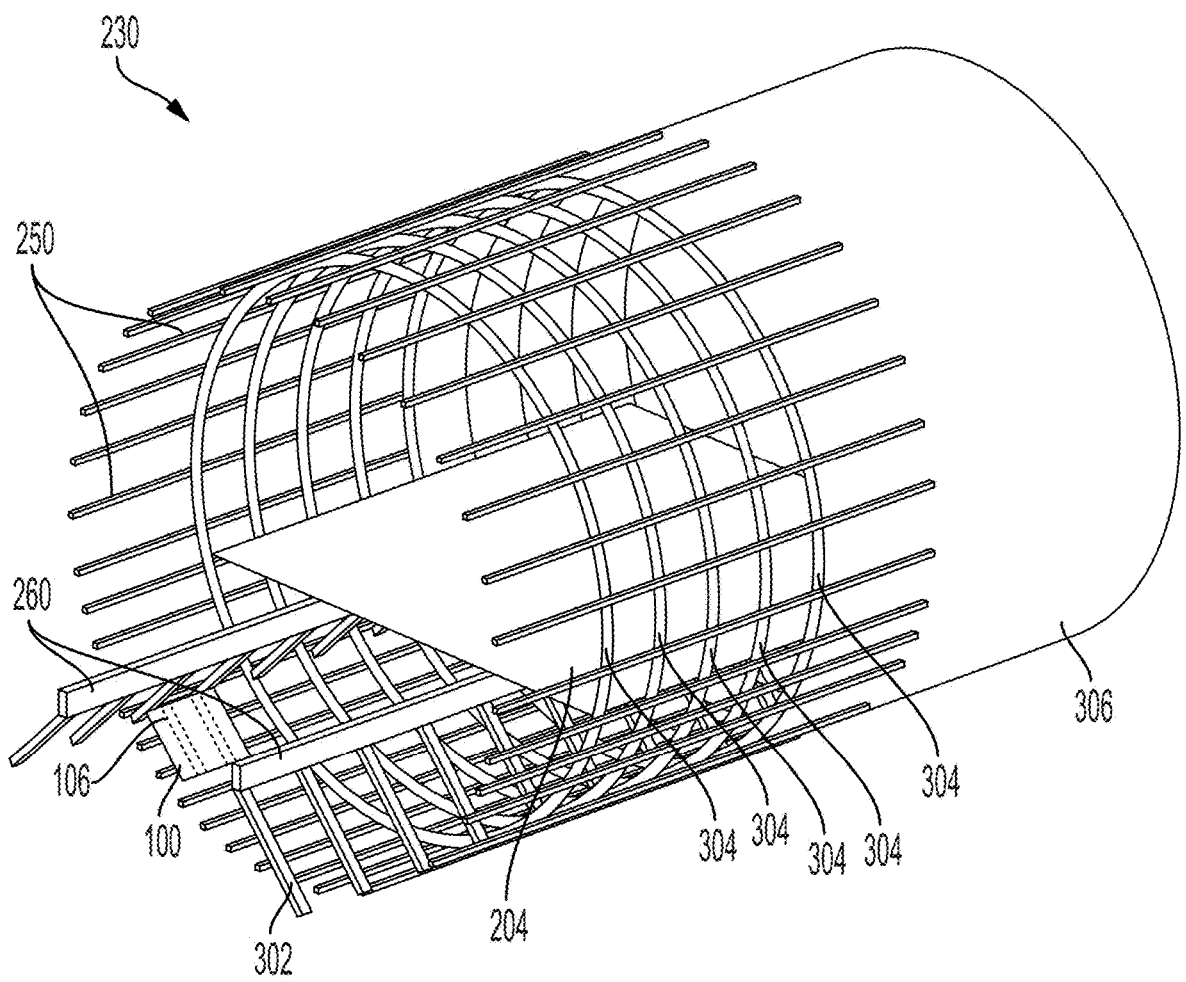
FIG. 3 illustrates a structural view of an aircraft fuselage that includes the insulation blanket assembly, according to an exemplary embodiment.

FIG. 3 illustrates a structural view of the aircraft fuselage 230 that includes the insulation blanket assembly 100, according to an exemplary embodiment.

The aircraft fuselage 230 includes the floor 204 that is supported by the plurality of supporting beams 260. The supporting beams 260 can be coupled to (and supported by) a plurality of struts 302. The aircraft stringers 250 run along the side of the aircraft fuselage 230 and are supported by a plurality of circular frame structures 304. For example, the plurality of stringers 250 may be attached to the plurality of frame structures 304 and may extend laterally along a length of the fuselage 230. The skin 306 of the aircraft 200 is coupled to the circular frame structures 304 and the aircraft stringers 250.

As illustrated in FIG. 3, the support rails 106 of the insulation blanket assembly 100 are positioned perpendicular to the orientation of the aircraft stringers 250. As a result, moisture (e.g., the water droplets 225) can travel downwardly and be collected at the bottom of the aircraft fuselage 230 for discharge. Typically, existing insulation blankets become heavily saturated due to the water droplets 225; however, the configuration of the support rails 106 on the insulation blanket assembly 100 enable the insulation material 110 to be separated from the water droplets 225 as the droplets 225 travel downwardly, which also promotes vertical drainage of the water droplets 225.

Figure 4A:
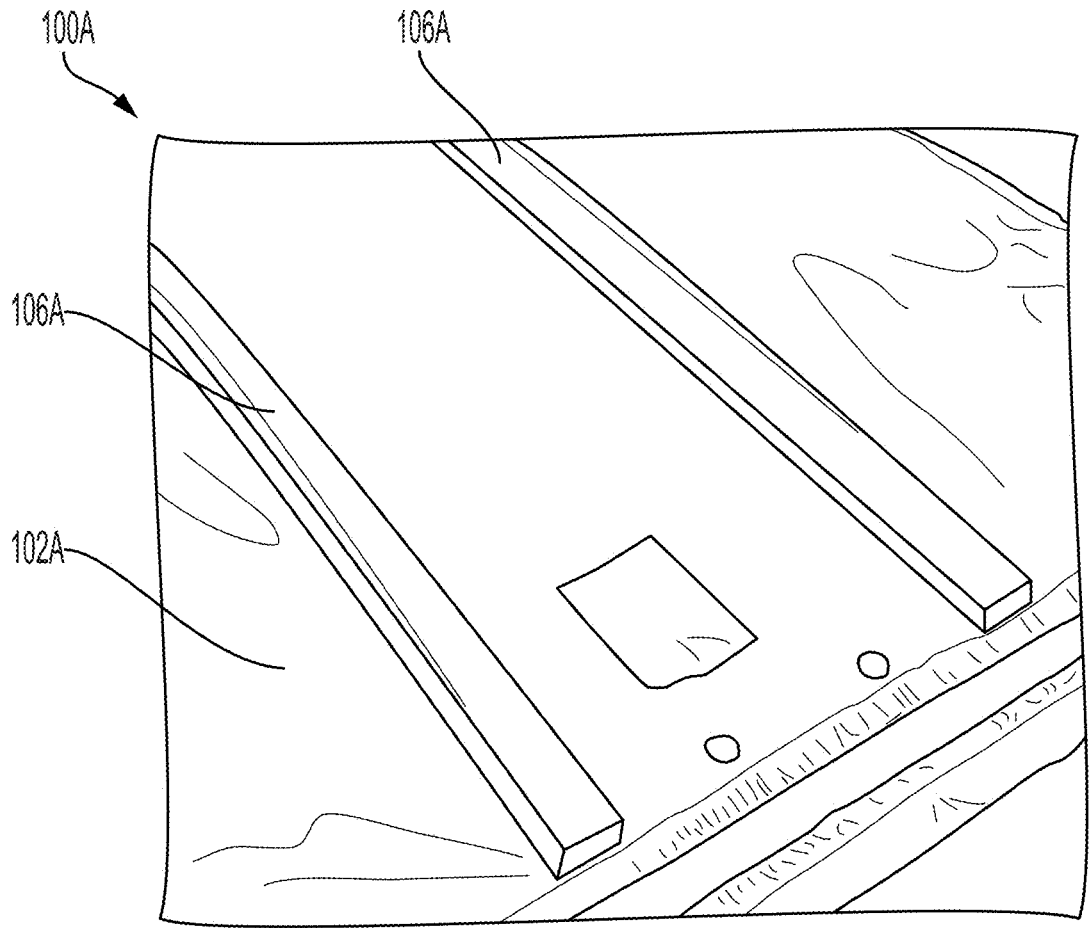
FIG. 4A illustrates an insulation blanket assembly that includes one or more support rails attached to an outboard material, according to an exemplary embodiment.

FIG. 4A illustrates the insulation blanket assembly 100A that includes one or more support rails attached to an outboard material, according to an exemplary embodiment. As illustrated in FIG. 4A, the support rails 106A are attached to the outboard material 102A of the cover 101A such that the outboard material 102A is between the insulation material (not shown in FIG. 4A) and the support rails 106A.

Figure 4B:
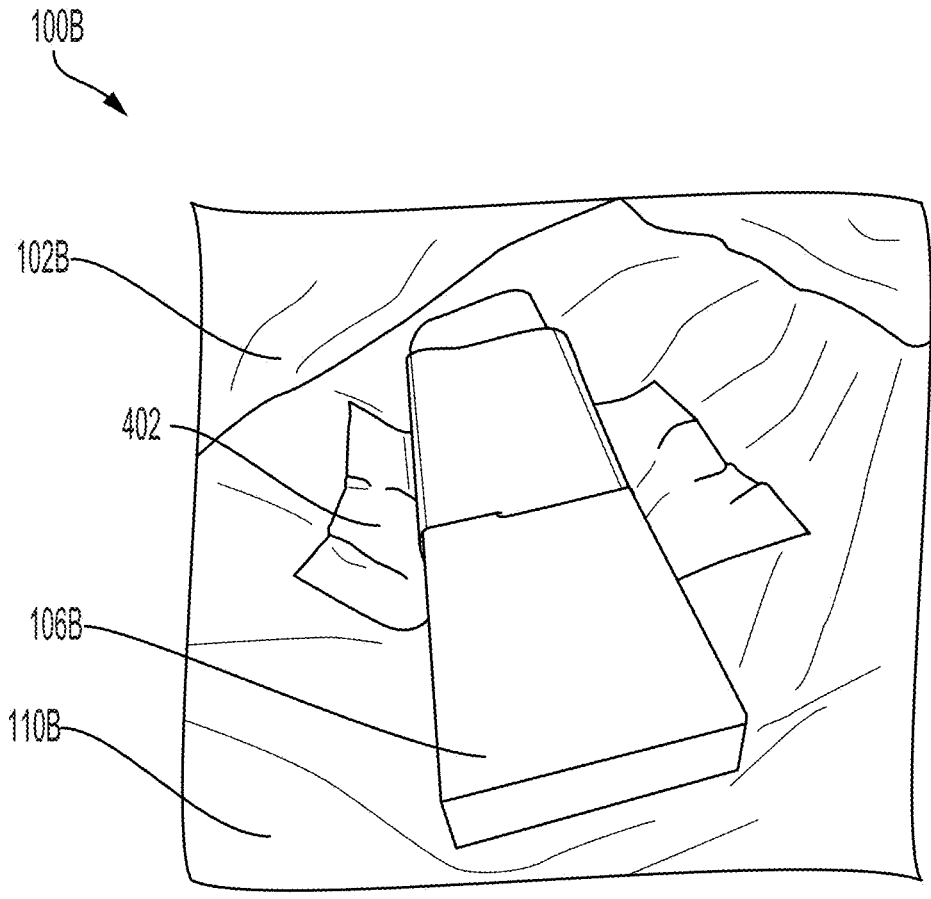
FIG. 4B illustrates an insulation blanket assembly that includes one or more support rails attached to an insulation material, according to an exemplary embodiment.

FIG. 4B illustrates an insulation blanket assembly that includes one or more support rails attached to an insulation material, according to an exemplary embodiment. As illustrated in FIG. 4B, the support rail 106B is attached to the insulation material 110B via an adhesive 402, such as double-sided tape. The support rail 106B is between the insulation material 110B and the outboard material 102B of the cover 101B.

Figure 5:
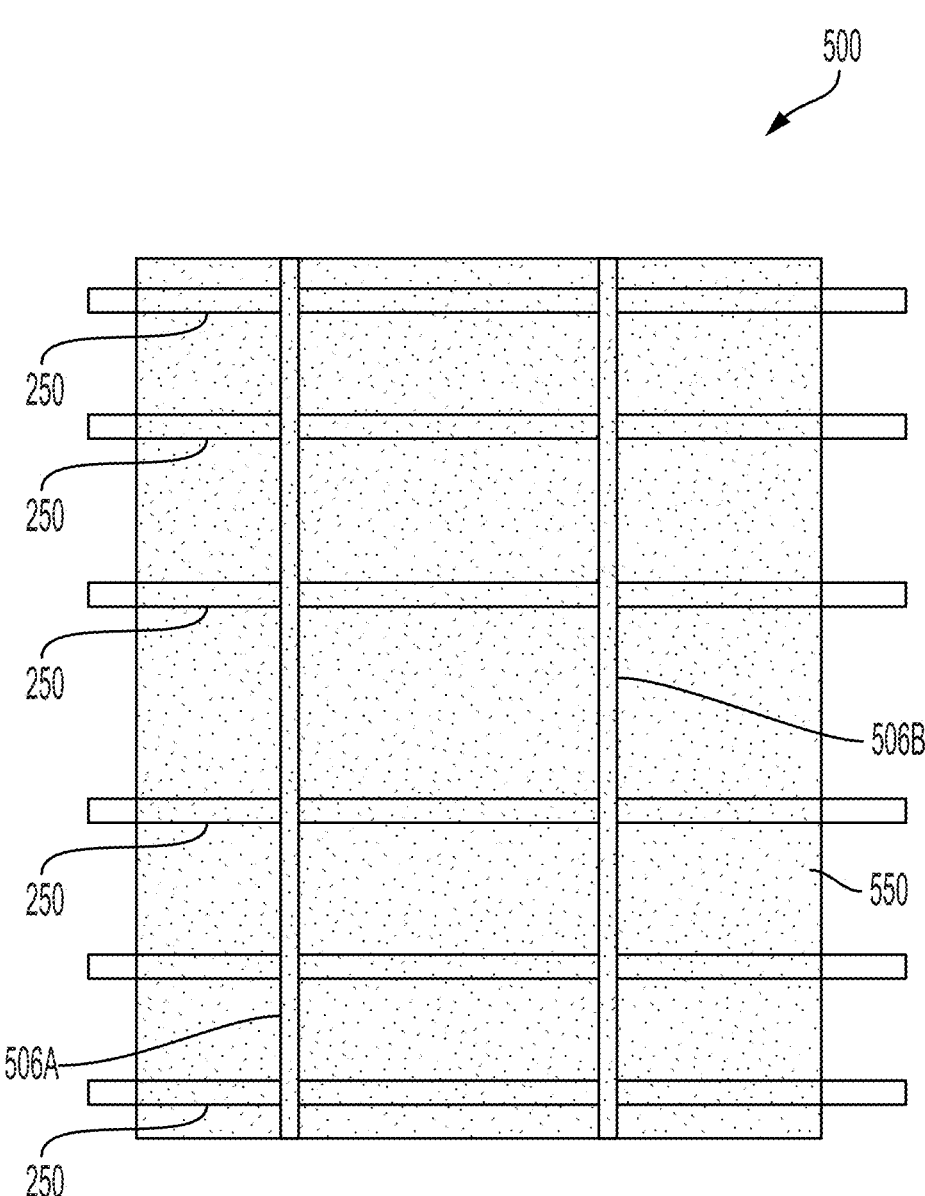
FIG. 5 illustrates a diagram of one or more support rails attached to an insulation blanket, according to an exemplary embodiment.

Referring to FIG. 5, a diagram 500 of one or more support rails attached to an insulation blanket is illustrated, according to an exemplary embodiment The diagram 500 depicts an insulation blanket 550 that rests on one or more aircraft stringers 250. One or more support rails 506A, 506B are positioned to elevate the insulation blanket 550 with respect to the aircraft stringers 250. For example, in FIG. 5, two (2) support rails 506A, 506B are positioned to elevate the insulation blanket 550 with respect to the aircraft stringers 250 to reduce the rate at which the insulation blanket 550 becomes saturated with moisture associated with the aircraft stringers 250 or with aircraft skin. The support rails 506A, 506B can be comprised of a foam material.

Figure 6:
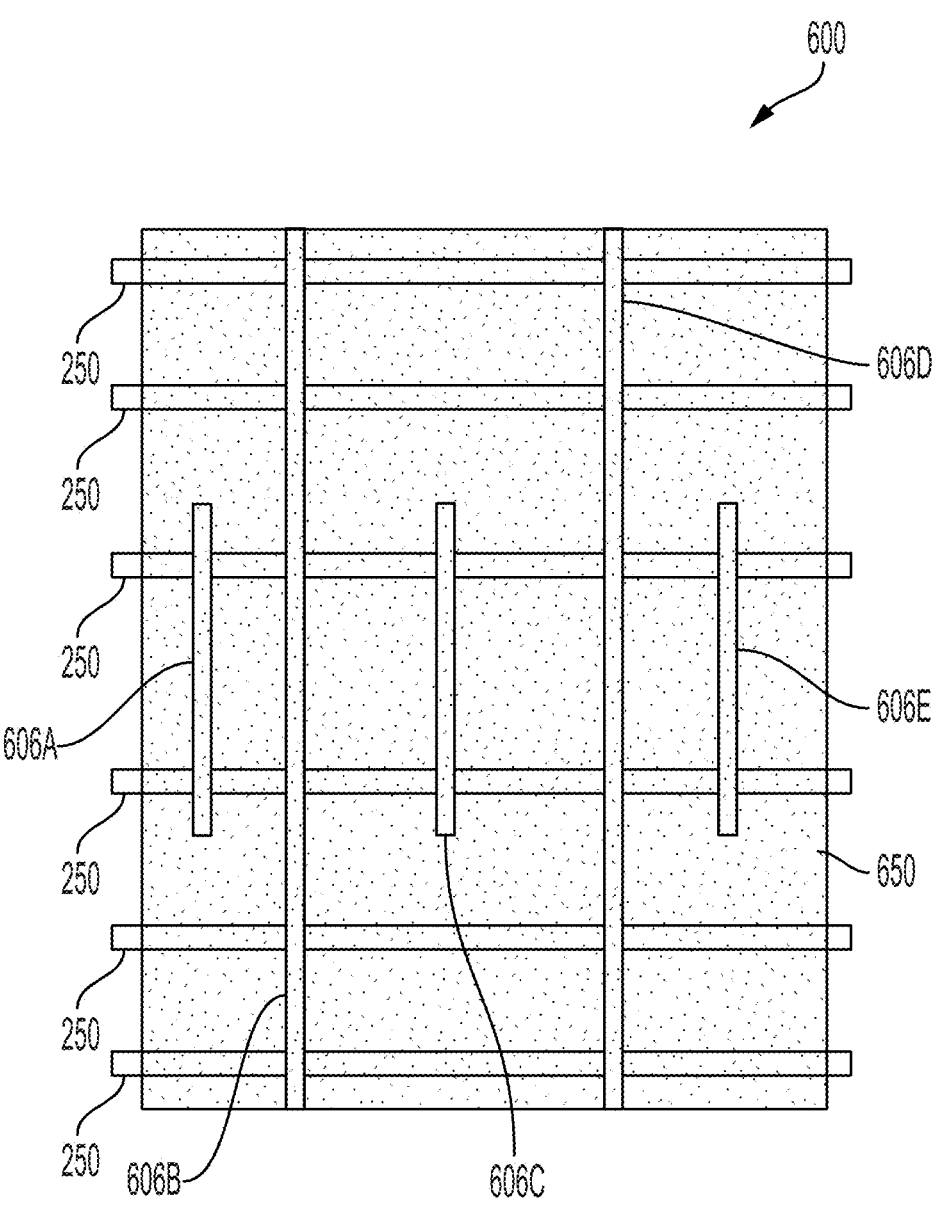
FIG. 6 illustrates another diagram of one or more support rails attached to an insulation blanket, according to an exemplary embodiment.

Referring to FIG. 6, a diagram 600 of one or more support rails attached to an insulation blanket is illustrated, according to an exemplary embodiment The diagram 600 depicts an insulation blanket 650 that rests on one or more aircraft stringers 250. One or more support rails 606A, 606B, 606C, 606D, 606E are positioned to elevate the insulation blanket 650 with respect to the aircraft stringers 250. For example, in FIG. 6, five (5) support rails 606A, 606B, 606C, 606D, 606E are positioned to elevate the insulation blanket 650 with respect to the aircraft stringers 250 to reduce the rate at which the insulation blanket 650 becomes saturated with moisture associated with the aircraft stringers 250 or with aircraft skin. In FIG. 6, the support rails 606B, 606D are longer than the support rails 606A, 606C, 606E. Thus, different support rails 606 can have different dimensions, as further illustrated in FIG. 7. The support rails 606A, 606B, 606C, 606D, 606E can be comprised of a foam material.

Figure 7:
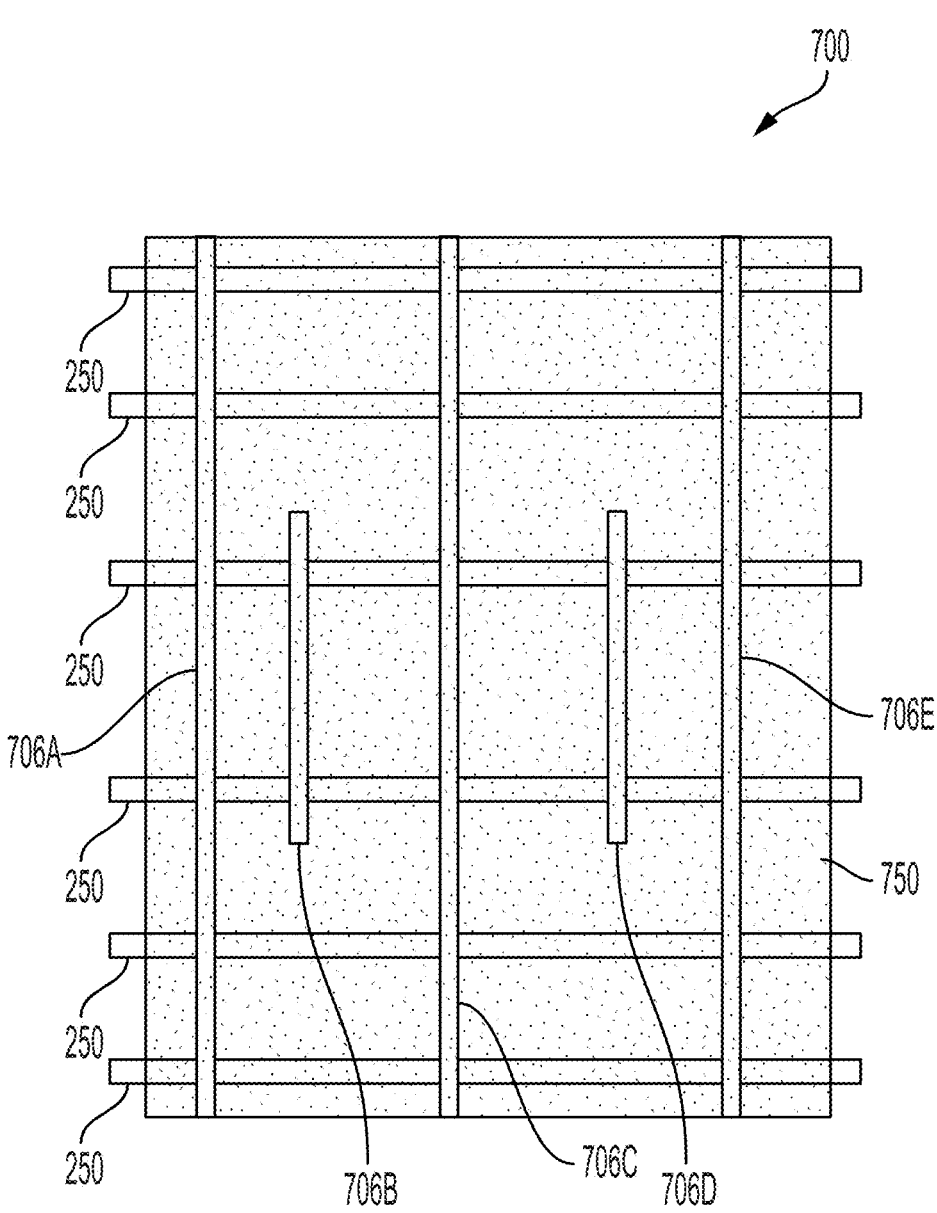
FIG. 7 illustrates another diagram of one or more support rails attached to an insulation blanket, according to an exemplary embodiment.

Referring to FIG. 7, a diagram 700 of one or more support rails attached to an insulation blanket is illustrated, according to an exemplary embodiment The diagram 700 depicts an insulation blanket 750 that rests on one or more aircraft stringers 250. One or more support rails 706A, 706B, 706C, 706D, 706E are positioned to elevate the insulation blanket 750 with respect to the aircraft stringers 250. For example, in FIG. 7, five (5) support rails 706A, 706B, 706C, 706D, 706E are positioned to elevate the insulation blanket 750 with respect to the aircraft stringers 250 to reduce the rate at which the insulation blanket 750 becomes saturated with moisture associated with the aircraft stringers 250 or with aircraft skin. In FIG. 7, the support rails 706B, 706D are shorter than the support rails 706A, 706C, 706E. Thus, different support rails 706 can have different dimensions. The support rails 706A, 706B, 706C, 706D, 706E can be comprised of a foam material.

Figure 8A:
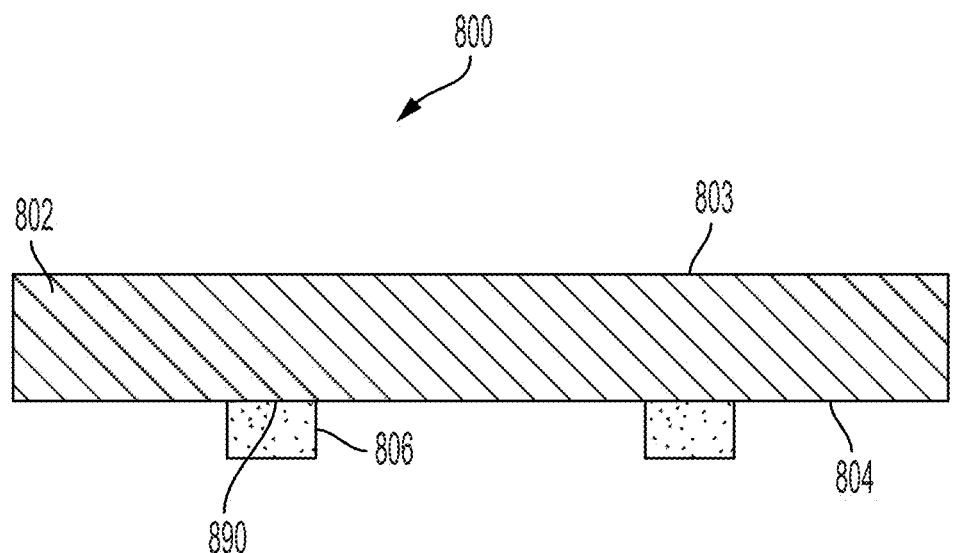
FIG. 8A illustrates a cross-sectional diagram of portions of an insulation blanket that includes a support rail having a beveled cut, according to an exemplary embodiment.

Referring to FIG. 8A, a cross-sectional diagram 800 of portions of an insulation blanket that includes a support rail having a beveled cut is illustrated, according to an exemplary embodiment.

The diagram 800 depicts portions of an insulation blanket. For example, the diagram 800 depicts an inboard region 803 of a cover material, an outboard region 804 of the cover material, and an insulation material 802 between the inboard region 803 of the cover material and the outboard region 804 of the cover material. The diagram 800 also depicts a support rail 806 attached to the outboard region 804 of the cover material. In particular, an adhesive side 890 of the support rail 806 is attached to the outboard region 804 of the cover material.

Figure 8B:
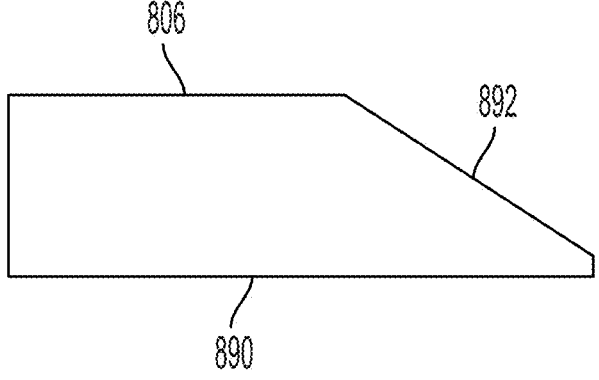
FIG. 8B illustrates a diagram of a portion of a support rail with a beveled cut, according to an exemplary embodiment.

Referring to FIG. 8B, a diagram of a portion of the support rail with a beveled cut is illustrated, according to an exemplary embodiment. The support rail 806 can be comprised of a foam material. The support rail 806 has a beveled cut 892 towards the non-adhesive side to facilitate sliding the insulation blanket into position.

Figure 9A:
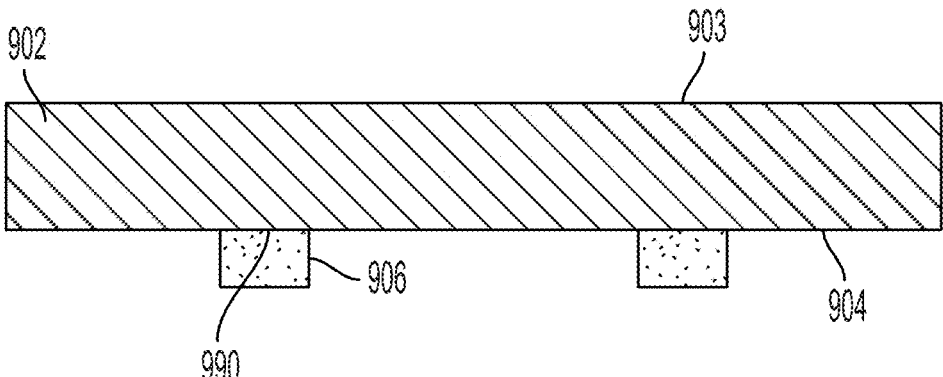
FIG. 9A illustrates a cross-sectional diagram of portions of an insulation blanket that includes a support rail having a straight edge, according to an exemplary embodiment.

Referring to FIG. 9A, a cross-sectional diagram 900 of portions of an insulation blanket that includes a support rail having a straight edge is illustrated, according to an exemplary embodiment.

The diagram 900 depicts portions of an insulation blanket. For example, the diagram 900 depicts an inboard region 903 of a cover material, an outboard region 904 of the cover material, and an insulation material 902 between the inboard region 903 of the cover material and the outboard region 904 of the cover material. The diagram 900 also depicts a support rail 906 attached to the outboard region 904 of the cover material. In particular, an adhesive side 990 of the support rail 906 is attached to the outboard region 904 of the cover material.

Figure 9B:
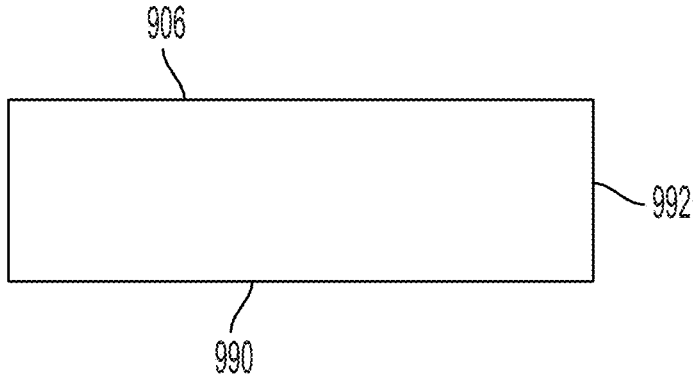
FIG. 9B illustrates a diagram of a portion of a support rail with a straight edge, according to an exemplary embodiment.

Referring to FIG. 9B, a diagram of a portion of the support rail with a straight edge is illustrated, according to an exemplary embodiment. The support rail 906 can be comprised of a foam material. The support rail 906 has a straight edge 992 (e.g., a straight 90 degrees cut) between the adhesive side 990 and the non-adhesive side.

Figure 10A:
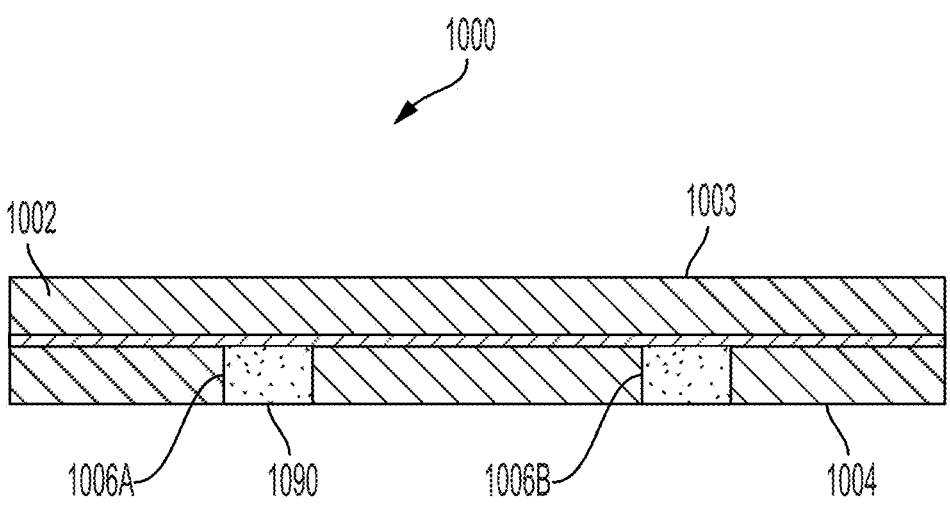
FIG. 10A illustrates a cross-sectional diagram of portions of an insulation blanket that includes a support rail having a beveled cut, according to an exemplary embodiment.

Referring to FIG. 10A, a cross-sectional diagram 1000 of portions of an insulation blanket that includes a support rail having a beveled cut is illustrated, according to an exemplary embodiment.

The diagram 1000 depicts portions of an insulation blanket. For example, the diagram 1000 depicts an inboard region 1003 of a cover material, an outboard region 1004 of the cover material, and an insulation material 1002 between the inboard region 1003 of the cover material and the outboard region 1004 of the cover material. The diagram 1000 also depicts support rails 1006A, 1006B between the outboard region 1004 of the cover material and the insulation material 1002. In particular, an adhesive side 1090 of the support rail 1006A is attached to the outboard region 1004 of the cover material. The same approach applies to support rail 1006B, etc.

Figure 10B:
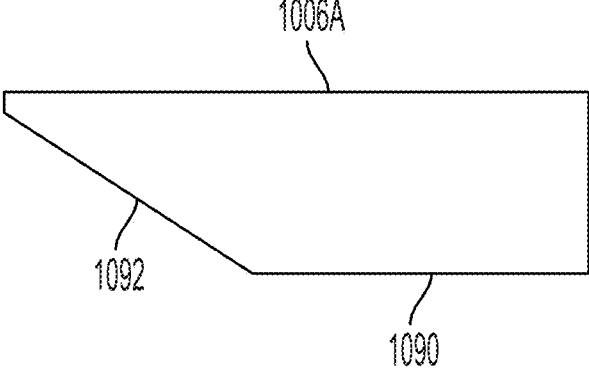
FIG. 10B illustrates a diagram of a portion of a support rail with a beveled cut, according to an exemplary embodiment.

Referring to FIG. 10B, a diagram of a portion of the support rail with a beveled cut is illustrated, according to an exemplary embodiment. The support rail 1006 can be comprised of a foam material. The support rail 1006 has a beveled cut 1092 towards the adhesive side 1090. The same approach applies to support rail 1006B, etc.

Figure 11:
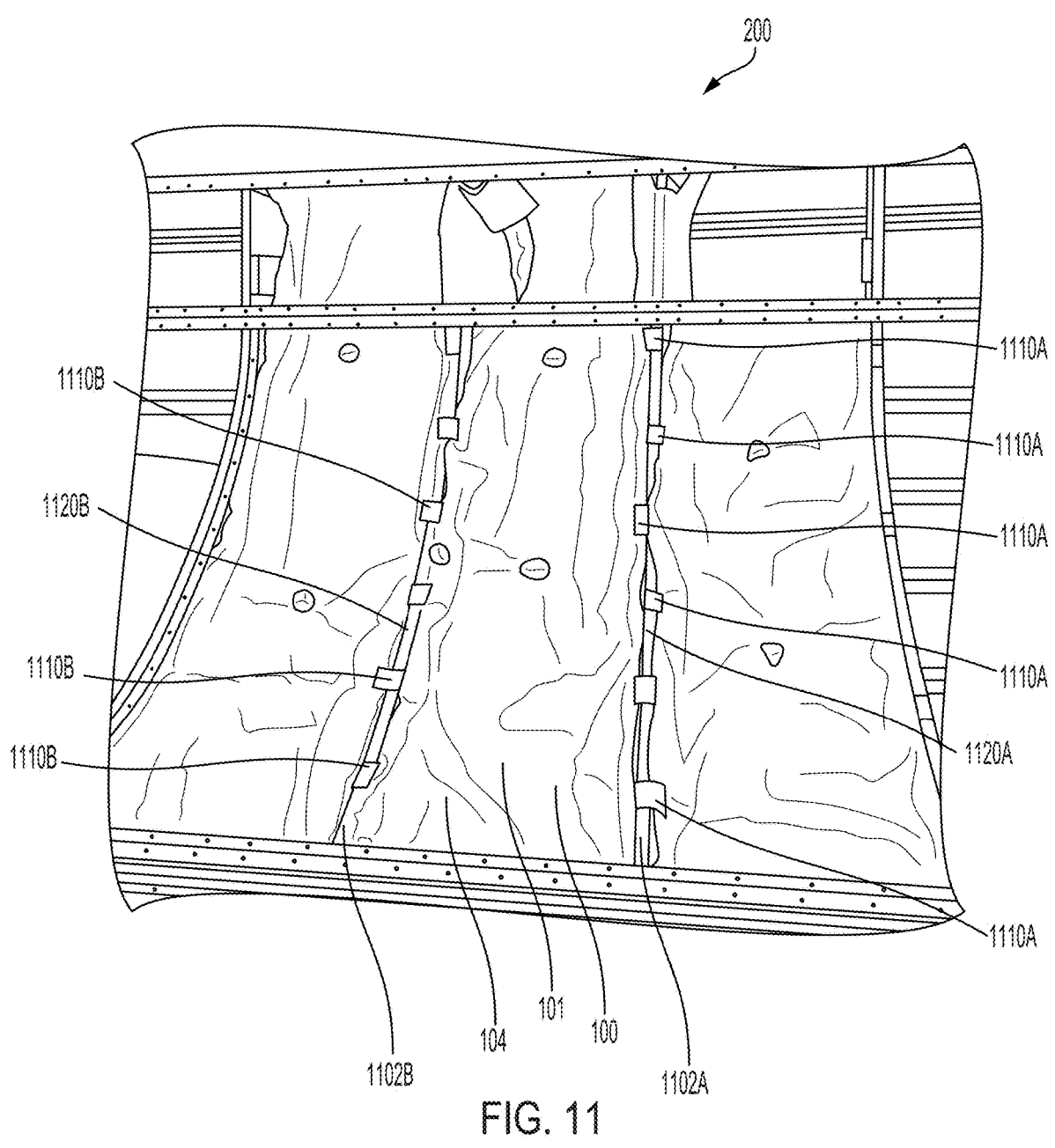
FIG. 11 illustrates a diagram of an insulation blanket assembly installed on an aircraft, according to an exemplary embodiment.

Referring to FIG. 11, a diagram of an insulation blanket assembly installed on the aircraft 200 is illustrated, according to an exemplary embodiment.

As illustrated in FIG. 11, the aircraft 200 may include an inner mold line 1102A and an inner mold line 1102B. The inner mold line 1102A may be an inner mold line of a first frame structure 304 depicted in FIG. 3, and the inner mold line 1102B may be an inner mold line of a second frame structure 304 depicted in FIG. 3. Hook tape 1120A (e.g., double-sided tape) may be aligned along the inner mold line 1102A, and hook tape 1120B may be aligned along the inner mold line 1102B. For example, one side of the hook tape 1120A, 1120B may be attached to the respective inner mold line 1102A, 1102B, and the other side of the hook tape 1120A, 1120B may include an adhesive that can adhere to blanket tabs 1110A, 1110B, as described below.

The insulation blanket assembly 100 may include (i) a first group of blanket tabs 1110A attached to a first edge of the outboard material 102 of the cover 101 and (ii) a second group of blanket tabs 1110B attached to a second edge of the outboard material 102 of the cover 101. To install the installation blanket assembly 100 to the aircraft 200, the first group of blanket tabs 1110A may be attached to the hook tape 1120A, and the second group of blanket tabs 1110B may be attached to the hook tape 1120B.

Figure 12:
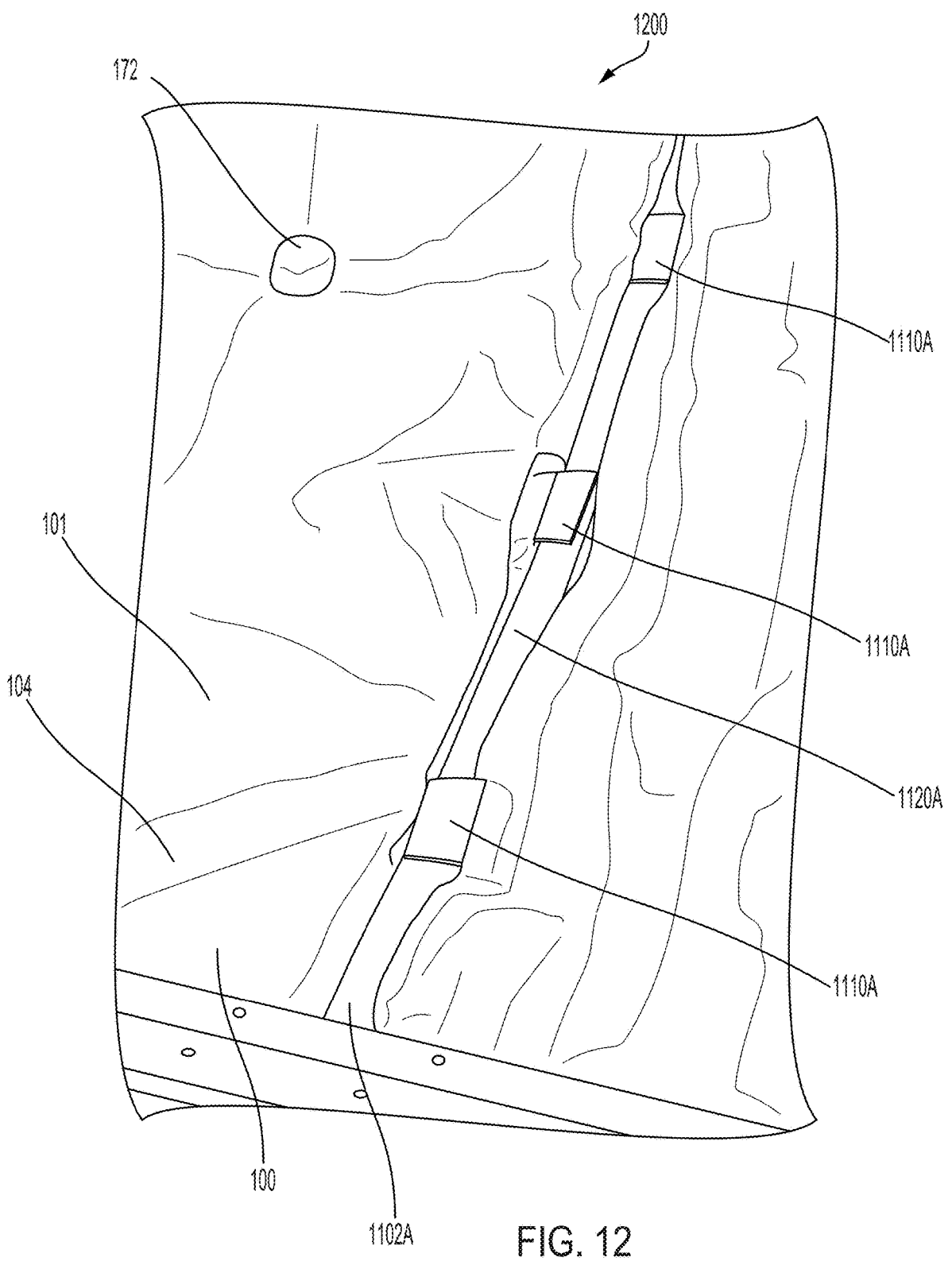
FIG. 12 illustrate a diagram of attaching blanket tabs to an inner mold line of a frame structure of an aircraft, according to an exemplary embodiment.

Referring to FIG. 12, a diagram 1200 of attaching the blanket tabs to an inner mold line of a frame structure of an aircraft is illustrated, according to an exemplary embodiment. According to the diagram 1200, the hook tape 1120A is aligned along the inner mold line 1102A. The first group of blanket tabs 1110A is attached to the hook tape 1120A to secure the insulation blanket assembly 100 to the inner mold line 1102A.

Figure 13:
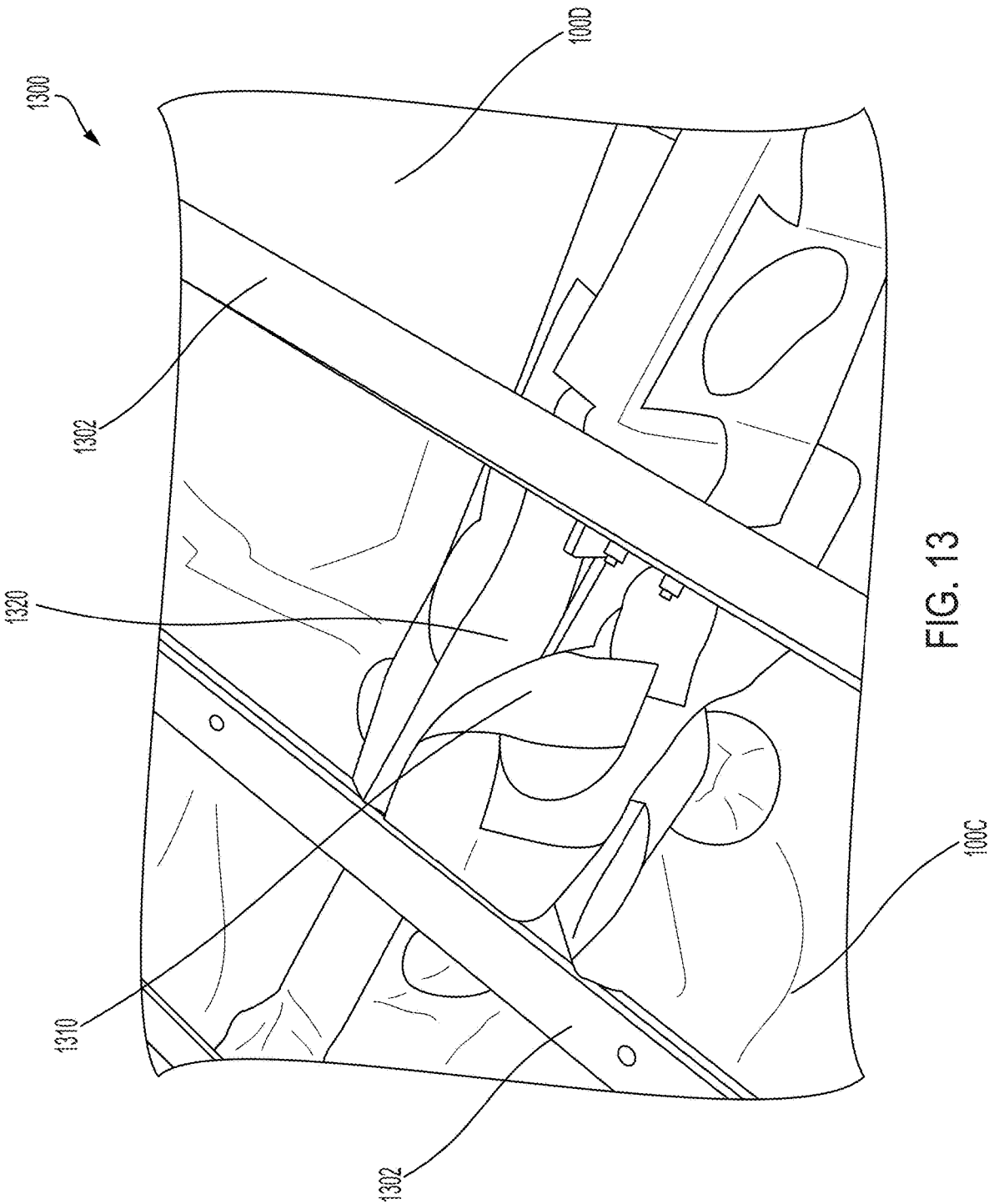
FIG. 13 illustrates a diagram of attaching a first blanket tab of a first insulation blanket assembly to a second blanket tab of a second insulation blanket assembly, according to an exemplary embodiment.

Referring to FIG. 13, a diagram 1300 of attaching a first blanket tab of a first insulation blanket assembly to a second blanket tab of a second insulation blanket assembly, according to an exemplary embodiment.

In the diagram 1300, a plurality of aircraft structures 1302 are illustrated. In some implementations, the aircraft structures 1302 can correspond to supports for aircraft flooring, such as the floor 204. The diagram 1300 also includes an insulation blanket assembly 100C and an insulation blanket assembly 100D. Each insulation blanket assembly 110C, 110D can correspond to the insulation blanket assembly 100A or the insulation blanket assembly 100B. The insulation blanket assemblies 100C, 100D are placed under the aircraft structures 1302 to provide thermal and acoustic insulation to an aircraft.

To install the installation blanket assemblies 100C, 100D, tape 1310 (e.g., hook tape and/or loop tape) attached to a blanket tab of the insulation blanket assembly 100C can be placed on tape 1320 (e.g., double-sided hook tape and/or loop tape) attached to a blanket tab of the insulation blanket assembly 100D.

Figure 14:
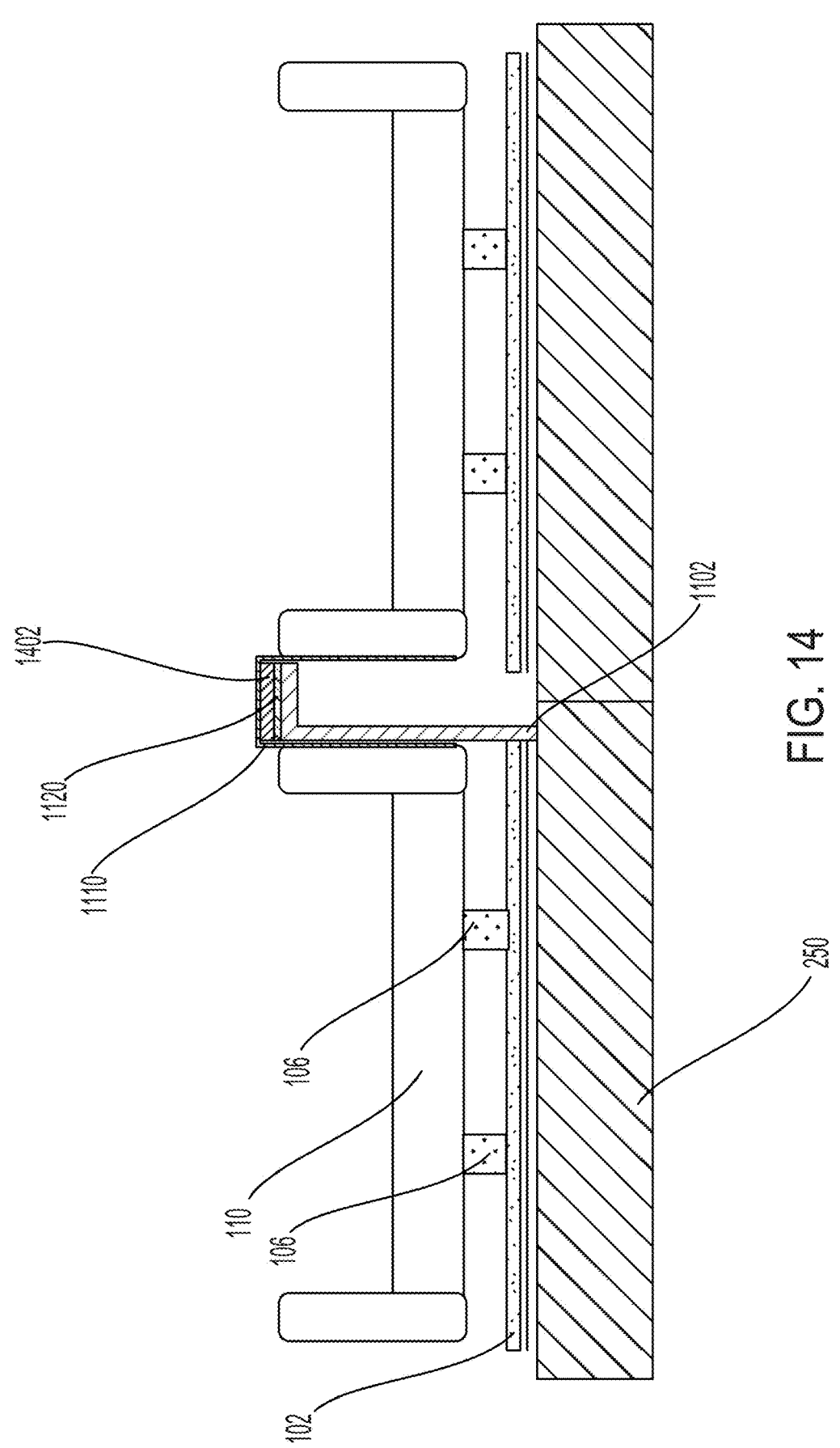
FIG. 14 illustrates a cross-sectional diagram of an installation blanket assembly installed on an aircraft, according to an exemplary embodiment.

Referring to FIG. 14, a cross-sectional diagram 1400 of an installation blanket assembly installed on an aircraft is illustrated, according to an exemplary embodiment.

In the diagram 1400, the stringer 250 is coupled to the inner mold line 1102 of a frame structure, such as one of the frame structures 304 of FIG. 3. Portions of the insulation blanket assembly 100 are also depicted in FIG. 14. For example, the insulation material 110 and the outboard material 102 are depicted in FIG. 14. The support rails 106 are attached to the insulation material 110 to provide separation between the stringers 250 and the insulation material 110, which reduces or eliminates moisture from transferring to the insulation material 110.

The hook tape 1120 is aligned along the mold line 1102. The blanket tab 1110 is attached to the hook tape 1120 via loop tape 1402. For example, the loop tape 1402 (e.g., double-sided tape) may be attached to blanket tab 1110. The loop tape 1402 is placed on the hook tape 1120 to provide additional adhesive security when installing the insulation blanket assembly 100.

Figure 15:
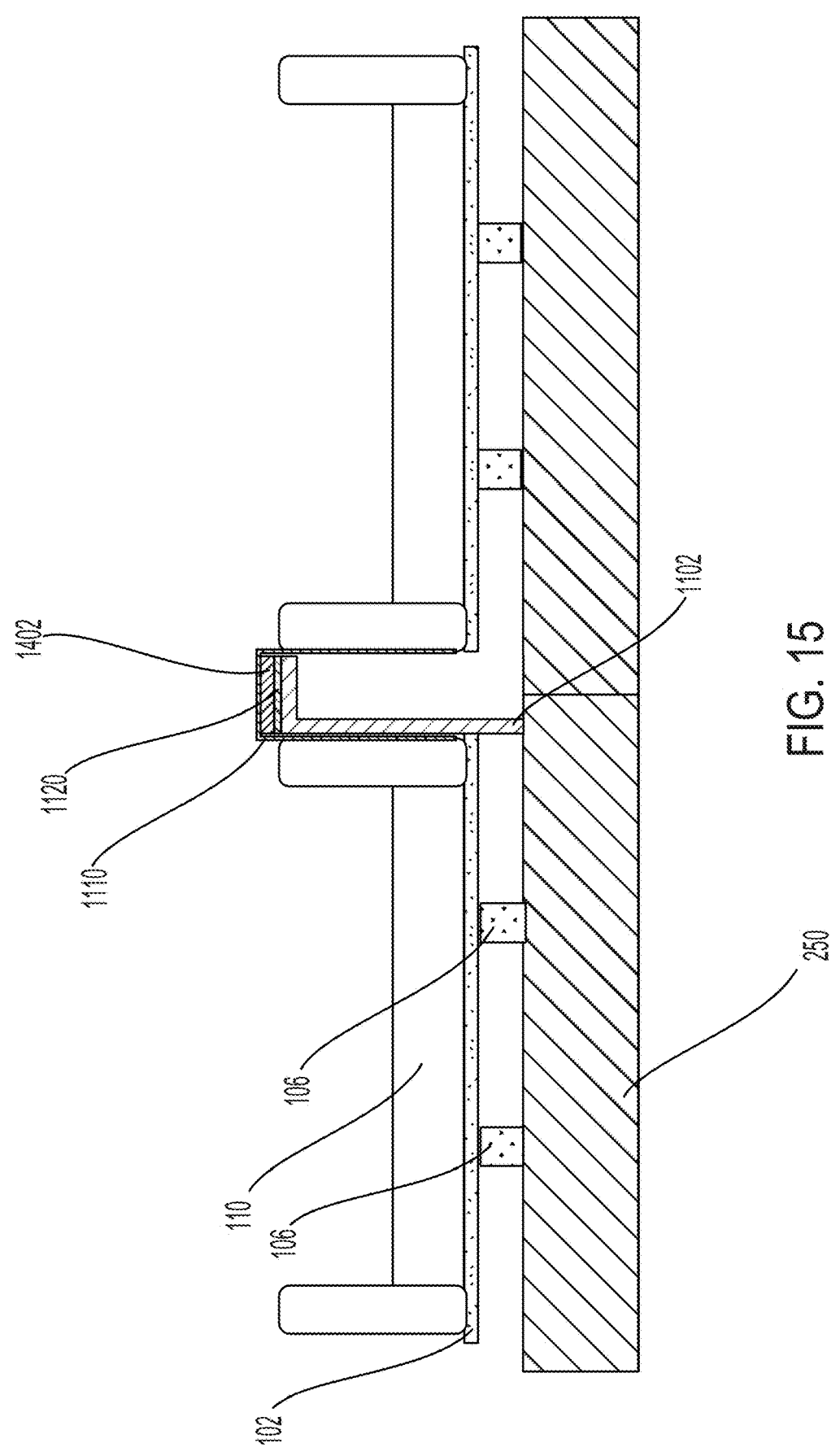
FIG. 15 illustrates another cross-sectional diagram of an installation blanket assembly installed on an aircraft, according to an exemplary embodiment.

Referring to FIG. 15, another cross-sectional diagram 1500 of an installation blanket assembly installed on an aircraft is illustrated, according to an exemplary embodiment.

In the diagram 1500, the stringer 250 is coupled to the inner mold line 1102 of the frame structure, such as one of the frame structures 304 of FIG. 3. Portions of the insulation blanket assembly 100 are also depicted in FIG. 15. For example, the insulation material 110 and the outboard material 102 are depicted in FIG. 15. The support rails 106 are attached to the outboard material 102 to provide separation between the stringers 250 and the insulation material 110, which reduces or eliminates moisture from transferring to the insulation material 110.

The hook tape 1120 is aligned along the mold line 1102. The blanket tab 1110 is attached to the hook tape 1120 via loop tape 1402. For example, the loop tape 1402 (e.g., double-sided tape) may be attached to blanket tab 1110. The loop tape 1402 is placed on the hook tape 1120 to provide additional adhesive security when installing the insulation blanket assembly 100.

Figure 16:
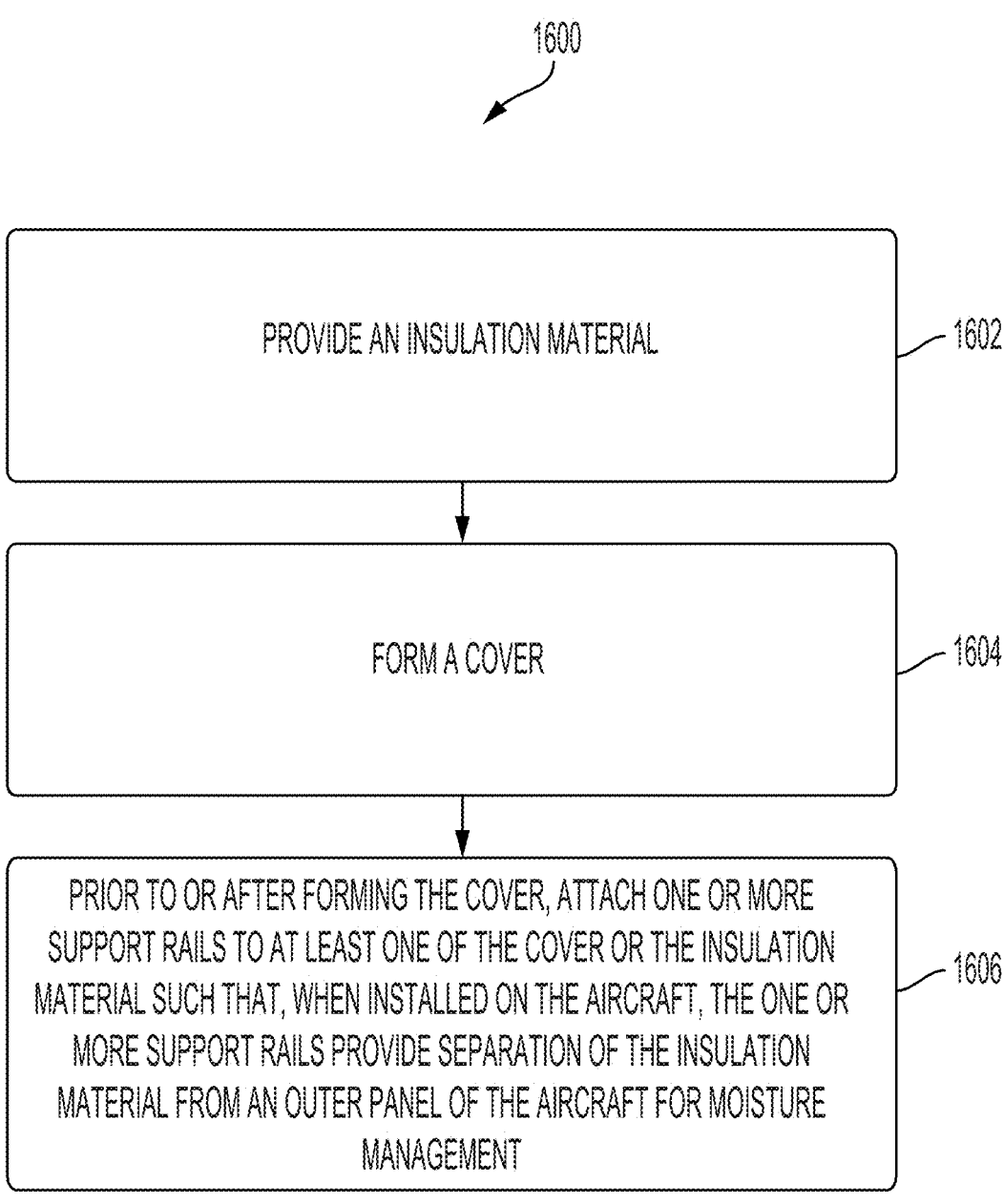
FIG. 16 is a flowchart of an example of an implementation of a method, according to an exemplary embodiment.

FIG. 16 illustrates a flow chart of a method 1600, according to an exemplary embodiment.

The method 1600 includes providing an insulation material, at block 1602.

The method 1600 also includes forming a cover, at block 1604.

The method 1600 also includes, prior to or after forming the cover, attaching one or more support rails to at least one of the cover or the insulation material such that, when installed on the aircraft, the one or more support rails provide separation of the insulation material from an outer panel of the aircraft for moisture management, at block 1606.

According to one implementation of the method 1600, forming the cover includes attaching an inboard material to an outboard material such that the insulation material is between the inboard material and the outboard material.

According to one implementation of the method 1600, attaching the one or more support rails includes attaching the one or more support rails to the insulation material such that the one or more support rails are positioned between the outboard material and the insulation material.

According to one implementation of the method 1600, attaching the one or more support rails includes attaching the one or more support rails to the outboard material such that the outboard material is between the insulation material and the one or more support rails.

According to one implementation, the method 1600 may include, prior to attaching the one or more support rails, forming a beveled edge on opposing endos of an elongated member. The elongated member may correspond to at least one support rail of the one or more support rails.

According to one implementation of the method 1600, attaching the one or more support rails includes (i) attaching a first support rail of the one or more support rails to at least one of the cover or the insulation material and (ii) attaching a second support rail of the one or more support rails to at least one of the cover of the insulation material. The first support rail and the second support rail may have a parallel orientation.

FIG. 17 illustrates a flow chart of a method 1700, according to an exemplary embodiment.

The method 1700 includes applying (i) first hook tape to a first inner mold line of a first aircraft frame structure and (ii) second hook tape to a second inner mold line of a second aircraft frame structure, at block 1702. The first hook tape and the second hook tape are double-sided tapes.

The method 1700 also includes applying (i) first loop tape to a first group of blanket tabs attached to a first edge of an outboard material of an insulation blanket assembly and (ii) second loop tape to a second group of blanket tabs attached to a second edge of the outboard material, at block 1704. The first loop tape and the second loop tape are double-sided tapes, and the insulation blanket assembly includes one or more support rails that extend transverse relative to aircraft stringers.

The method 1700 also includes attaching (i) the first group of blanket tabs to the first inner mold line by placing the first loop tape on top of the first hook tape and (ii) the second group of blanket tabs to the second inner mold line by placing the second loop tape on top of the second hook tape, at block 1706.

The techniques described with respect to FIGS. 1-17 reduce the likelihood or risk of an insulation blanket blocking water on its way down drain paths by attaching support rails into the insulation blanket to elevate the insulation blanket (e.g., prevent the insulation blanket from laying flush against skin and structure in the lower lobe structure of the aircraft). The foam support rails allow water drainage above and below the surface of the insulation blanket. Additionally, the increased gap between the insulation blanket and the lower lobe structure of the aircraft can prevent insulation materials within the insulation blanket from becoming saturated with moisture, thus increasing the in-service performance of the insulation blanket.

Although the systems are described herein with specific reference to space systems or aerospace vehicles, in other embodiments, the system can be a vehicle other than a spacecraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An insulation blanket assembly for use on an aircraft, the insulation blanket assembly comprising:
    a cover having an inboard material and an outboard material;
    an insulation material between the inboard material and the outboard material, wherein an edge of the inboard material is attached to an edge of the outboard material, thereby forming a unit structure configured to be installed within the aircraft;
    one or more elongated support rails each being attached to at least one of the cover or the insulation material, wherein the one or more support rails are configured to extend transverse relative to a plurality of aircraft stringers to define drainage paths for channeling moisture, and wherein the one or more support rails provide separation between an aircraft structure and the insulation material to reduce or eliminate moisture from transferring to the insulation material; and
    at least one of the following:
    (i) wherein at least one elongated support rail of the one or more elongated support rails includes a beveled edge on opposing ends of the elongated member to facilitate sliding the insulation blanket assembly into position prior to securing to the aircraft structure;
    (ii) wherein the one or more elongated support rails are comprised of a flexible foam material, and wherein the cover and the insulation material are flexible, such that the insulation blanket assembly radially conforms to a shape of a fuselage of the aircraft when installed;
    (iii) wherein an edge of the outboard material is attached to an edge of the inboard material with tape, and wherein the one or more elongated support rails are attached with double-sided tape;
    (iv) wherein a first elongated support rail of the one or more elongated support rails has a first width, wherein a second elongated support rail of the one or more elongated support rails has a second width that is less than the first width, and wherein the first elongated support rail and the second elongated support rail are comprised of the same foam material such that the first elongated support rail has a different stiffness than the second elongated support rail to provide rigidity to the insulation blanket assembly;
    (v) wherein each elongated support rail of the one or more elongated support rails has a length that is less than a length of the cover such that ends of the one or more support rails are separated laterally from a perimeter of the cover;
    (vi) wherein a first elongated support rail of the one or more elongated support rails has a first length, wherein a second elongated support rail of the one or more elongated support rails has a second length that is less than the first length to provide variable rigidity along the insulation blanket assembly; and
    (vii) wherein the one or more elongated support rails are comprised of a closed cell foam.

2. The insulation blanket assembly of claim 1, wherein the one or more elongated support rails are attached to the insulation material such that the one or more elongated support rails are positioned between the outboard material and the insulation material.

3. The insulation blanket assembly of claim 1, wherein the one or more elongated support rails are attached to the outboard material such that the outboard material is between the insulation material and the one or more elongated support rails.

4. The insulation blanket assembly of claim 1, wherein the at least one elongated support rail of the one or more elongated support rails includes the beveled edge on opposing ends of the elongated member to facilitate sliding the insulation blanket assembly into position prior to securing to the aircraft structure.

5. The insulation blanket assembly of claim 1, wherein the one or more elongated support rails are comprised of the flexible foam material, and wherein the cover and the insulation material are flexible, such that the insulation blanket assembly radially conforms to the shape of the fuselage of the aircraft when installed.

6. The insulation blanket assembly of claim 1, wherein the edge of the outboard material is attached to the edge of the inboard material with the tape, and wherein the one or more elongated support rails are attached with the double-sided tape.

7. The insulation blanket assembly of claim 1, wherein the first elongated support rail of the one or more elongated support rails has the first width, wherein the second elongated support rail of the one or more elongated support rails has the second width that is less than the first width, and wherein the first elongated support rail and the second elongated support rail are comprised of the same foam material such that the first elongated support rail has the different stiffness than the second elongated support rail to provide rigidity to the insulation blanket assembly.

8. The insulation blanket assembly of claim 1, further comprising a plurality of attachment portions, wherein each attachment portion comprises a hole that extends through the cover and the insulation material to facilitate attachment of the insulation blanket assembly to the aircraft structure with a fastener.

9. The insulation blanket assembly of claim 1, wherein each elongated support rail of the one or more elongated support rails has the length that is less than the length of the cover such that ends of the one or more support rails are separated laterally from the perimeter of the cover.

10. The insulation blanket assembly of claim 1, wherein the first elongated support rail of the one or more elongated support rails has the first length, wherein the second elongated support rail of the one or more elongated support rails has the second length that is less than the first length to provide variable rigidity along the insulation blanket assembly.

11. The insulation blanket assembly of claim 1, wherein the one or more elongated support rails comprise at least two elongated support rails that extend in a parallel direction relative to each other.

12. An aircraft comprising:
    a fuselage comprising a plurality of frame structures and a plurality of stringers attached to the plurality of frame structures, the plurality of stringers extending laterally along a length of the fuselage; and
    the insulation blanket assembly of claim 1 attached to at least one frame structure of the plurality of frame structures or to at least one stringer of the plurality of stringers, wherein the one or more elongated support rails extend transverse relative to the plurality of stringers.

13. The aircraft of claim 12, wherein the one or more elongated support rails extend perpendicular relative to the plurality of stringers such that the one or more elongated support rails provide a drainage path downwardly towards a lower area of the fuselage.

14. The aircraft of claim 12, wherein first hook tape is aligned along a first inner mold line of a first frame structure of the plurality of frame structures and second hook tape is aligned along a second inner mold line of a second frame structure of the plurality of frame structures, wherein a first group of blanket tabs attached to a first edge of an outboard material of a cover of the insulation blanket assembly is attached to the first hook tape via first loop tape, and wherein a second group of blanket tabs attached to a second edge of the outboard material is attached to the second hook tape via second loop tape.

15. The aircraft of claim 14, wherein the first hook tape and the second hook tape comprise double-sided tape.

16. The insulation blanket assembly of claim 1, wherein the one or more elongated support rails are comprised of the closed cell foam.

17. A method of making an insulation blanket assembly for an aircraft, the method comprising:

providing an insulation material;

forming a cover having an inboard material and an outboard material, wherein the insulation material is between the inboard material and the outboard material, wherein an edge of the inboard material is attached to an edge of the outboard material, thereby forming a unit structure configured to be installed within the aircraft; and prior to or after forming the cover, attaching one or more elongated support rails to at least one of the cover or the insulation material such that, when installed on the aircraft, the one or more elongated support rails provide separation of the insulation material from an outer panel of the aircraft material to reduce or eliminate moisture from transferring to the insulation material, and wherein the one or more support rails are configured to extend transverse relative to a plurality of aircraft stringers to define drainage paths for channeling moisture; and providing at least one of the following:

(i) wherein at least one elongated support rail of the one or more elongated support rails includes a beveled edge on opposing ends of the elongated member to facilitate sliding the insulation blanket assembly into position prior to securing to the aircraft structure;

(ii) wherein the one or more elongated support rails are comprised of a flexible foam material, and wherein the cover and the insulation material are flexible, such that the insulation blanket assembly radially conforms to a shape of a fuselage of the aircraft when installed;

(iii) wherein an edge of the outboard material is attached to an edge of the inboard material with tape, and wherein the one or more elongated support rails are attached with double-sided tape;

(iv) wherein a first elongated support rail of the one or more elongated support rails has a first width, wherein a second elongated support rail of the one or more elongated support rails has a second width that is less than the first width, and wherein the first elongated support rail and the second elongated support rail are comprised of the same foam material such that the first elongated support rail has a different stiffness than the second elongated support rail to provide rigidity to the insulation blanket assembly;

(v) wherein each elongated support rail of the one or more elongated support rails has a length that is less than a length of the cover such that ends of the one or more support rails are separated laterally from a perimeter of the cover;

(vi) wherein a first elongated support rail of the one or more elongated support rails has a first length, wherein a second elongated support rail of the one or more elongated support rails has a second length that is less than the first length to provide variable rigidity along the insulation blanket assembly; and (vii) wherein the one or more elongated support rails are comprised of a closed cell foam.

18. The method of claim 17, wherein attaching the one or more elongated support rails comprises attaching the one or more elongated support rails to the insulation material such that the one or more elongated support rails are positioned between the outboard material and the insulation material.

19. The method of claim 17, wherein attaching the one or more elongated support rails comprises attaching the one or more elongated support rails to the outboard material such that the outboard material is between the insulation material and the one or more elongated support rails.

20. The method of claim 17, further comprising, prior to attaching the one or more elongated support rails, forming a beveled edge on opposing ends of an elongated member, wherein the elongated member corresponds to at least one elongated support rail of the one or more elongated support rails.

* * * * *